(12) United States Patent
Woloszynski et al.

(10) Patent No.: US 8,194,679 B2
(45) Date of Patent: Jun. 5, 2012

(54) SYSTEM FOR DATA TRANSFER IN A WIRELESS NETWORK

(75) Inventors: Charles H. Woloszynski, Vienna, VA (US); Bryan Berezdivin, Arlington, VA (US)

(73) Assignee: Elbit Systems of America, LLC, Fort Worth, TX (US)

( * ) Notice: Subject to any disclaimer, the term of this patent is extended or adjusted under 35 U.S.C. 154(b) by 885 days.

(21) Appl. No.: 11/957,811

(22) Filed: Dec. 17, 2007

(65) Prior Publication Data

US 2008/0144633 A1 Jun. 19, 2008

Related U.S. Application Data

(60) Provisional application No. 60/875,371, filed on Dec. 18, 2006.

(51) Int. Cl.
*H04L 12/56* (2006.01)
(52) U.S. Cl. .............. 370/395.31; 370/389; 370/394; 370/395.1; 370/412; 455/422.1; 455/445
(58) Field of Classification Search .......... 370/389, 370/394, 395.1, 400, 230.1, 412, 432, 229, 370/392, 351; 455/445, 422.1
See application file for complete search history.

(56) References Cited

U.S. PATENT DOCUMENTS

| 6,389,016 | B1 * | 5/2002 | Sabaa et al. ................. 370/389 |
| 7,215,637 | B1 * | 5/2007 | Ferguson et al. .......... 370/230.1 |
| 2004/0114518 | A1 * | 6/2004 | MacFaden et al. ........ 370/230.1 |
| 2005/0025167 | A1 * | 2/2005 | Ishibashi et al. ............. 370/412 |
| 2005/0054346 | A1 * | 3/2005 | Windham et al. ............ 455/445 |
| 2006/0239290 | A1 * | 10/2006 | Lin et al. ...................... 370/432 |

\* cited by examiner

*Primary Examiner* — Robert Wilson
*Assistant Examiner* — Mohamed Kamara
(74) *Attorney, Agent, or Firm* — Baker Botts L.L.P.

(57) ABSTRACT

A wireless network protocol employs a hop-by-hop block formation approach in which data packets are organized into data blocks at each hop according to a routing table and are transmitted to each hop as data blocks. For example, data packets to be transmitted from a source node to a destination are grouped into a data block associated with a routing table. The source node transmits the data packets according to the routing table. Each node in the routing table determines which data packets it must transmit to other nodes to complete transmission of the data packets to the destination. Each such node determines a new routing table and groups these data packets into a new data block associated with the new routing table. Each node transmits the data packets of the new data block according to the new routing table in a manner similar to the source node.

36 Claims, 23 Drawing Sheets

EXAMPLE FRAME FIELDS AND VALUES

| FRAME FIELD | VALUE |
|---|---|
| Link-layer destination address | 0xff ff ff ff ff ff |
| Link-layer source address | MAC address of the transmitter |
| Link-layer TYPE field (i.e., length field under IEEE 802.3) | 0x7A 7A for internal development and an IANA number, e.g., for future use, (e.g., 0xAAAA) |
| TYPE field for Opp. Block Transfer Protocol (e.g., 2 bits) | "ACK" or "INFO" |
| NLEN field for Opp. Block Transfer Protocol (e.g., 2 bits, values 1..4) | the number of NNOL addresses are included in the NNOL list |
| PLEN field for Opp. Block Transfer Protocol (e.g., 2 bits, values 0..3) | number of Opp. Block Transfer Protocol PAD octets added to align the payload to an appropriate word boundary |
| BLOCK LEN field Opp. Block Transfer Protocol (e.g., 8 bits) | block length to distinguish which bits in the MAP are valid |
| HOP COUNT field for Opp. Block Transfer Protocol (e.g., 8 bits) | assigned at the originating to a maximum value and decremented as it is transmitted by each new node (re-transmission from a node because of a lack of an ACK does not count as a hop) |
| SEQ ID field for Opp. Block Transfer Protocol (e.g., 8 bits) | a value that increments with each ACK from this transmitter, and can be used to detect missed ACKs |
| BLOCK ID field for Opp. Block Transfer Protocol (e.g., 16 bits) | assigned at the transmitting node |
| IEEE 802.3 CRC (32 bits) | value from the underlying link layer |

FIG. 8A

EXAMPLE FIELDS AND VALUES FOR ACK FRAMES

| FRAME FIELD | VALUE |
|---|---|
| BLOCK TXR field for Opp. Block Transfer Protocol (e.g., 48 bits) | assigned at the transmitting node – the link-layer source address used in the INFO frames |
| ACK MAP field for Opp. Block Transfer Protocol (e.g., [1..4], 4x32 bit fields) | indicates the ACK'ed frames from the appropriate node within the block by position within the MAP |
| NNOL DST field for Opp. Block Transfer Protocol (e.g., [1..4]. 1..4 x 48 bits fields) | indicates the NNOL DST addresses used in the original INFO frame transmissions |
| PAD field for Opp. Block Transfer Protocol (e.g., [0..3]) | octets to pad out the frame, if needed, to simplify aligning the payload and headers. |

FIG. 8B

| EXAMPLE FIELDS AND VALUES FOR INFO FRAMES ||
|---|---|
| FRAME FIELD | VALUE |
| NNOL DST field for for Opp. Block Transfer Protocol (e.g., [1..4]) | 1..4x 48 bit addresses |
| PAD field for for Opp. Block Transfer Protocol (e.g., [0..3]) | octets, if needed to align the IEEE payload to a word boundary |
| PKT ID field for for Opp. Block Transfer Protocol | assigned by the originator, making a unique tag when combined with the ORIG DST, from the IEEE 802.3 destination address field (48 bits) |
| ORIG SRC field for for Opp. Block Transfer Protocol | from the IEEE 802.3 source address field (48 bits) |
| ORIG TYPE field for for Opp. Block Transfer Protocol | from the IEEE 802.3 LENGTH field (16 bits) |
| IEEE 802.3 Payload field (46..2400 octets) | |

FIG. 8C

| EXAMPLES OF STATE DEFINITIONS FOR THE UISM ||
|---|---|
| State | Definition |
| INIT | Initial state when machine is created. Used when initializing the machine. Not reachable after initialization. |
| IF UP | Normal operational state. |
| IF DOWN | State to support Linux IFDOWN notion. Needs to be refined. |

FIG. 9B

| EXAMPLES OF EVENT DEFINITIONS FOR THE UISM ||
|---|---|
| Event | Definition |
| PRUF | Pre-route-lookup frame. A frame from the Ethernet interface. |
| PLUF | A frame with state about the OFIB lookup, essentially an encapsulating the upper layer frame with side state. |
| UP | Request to bring the interface up. |
| DOWN | Request to bring the interface down. |
| OFIB ADD | Request to add a new OFIB entry. Carries with it the address (48 bit MAC) along with the NNOL (1..4 48 bit addresses in priority order), and power control and waveform bit-rate settings. |
| OFIB DELETE | Request to delete an OFIB entry. Carries with it the target address. |
| NNOLQ IDLE | A message from an NNOLQ indicating that is has been idle for some period of time and may be reaped if needed. |
| NNOLQ RFD (READY FOR DELETION) | A message from an NNOLQ indicating that it has released its resources and is ready for deletion. |

FIG. 9C

| EXAMPLES OF STATE TRANSITIONS FOR THE UISM ||||| 611
| --- | --- | --- | --- | --- |
| State | Event | Condition | Action | Next State |
| INIT | - | - | initOFIB | IF UP |
| IF DOWN | UP | - | activateInterface | IF UP |
| IF DOWN | PRUF | - | discardFrame | IF DOWN |
| IF DOWN | OFIB ADD | Entry Exists in OFIB | updateOFIBEntry | IF DOWN |
| IF DOWN | OFIB ADD | Entry Does Not Exist in OFIB | addOFIBEntry | IF DOWN |
| IF DOWN | OFIB DELETE | Entry Exists in OFIB | removeOFIBEntry | IF DOWN |
| IF DOWN | OFIB DELETE | Entry Does Not Exist in OFIB | - | IF DOWN |
| IF DOWN | NNOLQ IDLE | - | reapNNOLQ | IF DOWN |
| IF DOWN | NNOLQ RFD | NNOLQ pending deletion | deleteNNOLQ | IF DOWN |
| IF DOWN | NNOLQ RFD | !NNOLQ pending deletion | - | IF DOWN |
| IF UP | DOWN | - | deactivateInterface | IF DOWN |
| IF UP | OFIB ADD | Entry Exists in OFIB | updateOFIBEntry | IF UP |
| IF UP | OFIB ADD | No Entry Exist in OFIB | addOFIBEntry | IF UP |
| IF UP | OFIB DELETE | Entry Exists in OFIB | removeOFIBEntry | IF UP |
| IF UP | OFIB DELETE | Entry Does Not Exist in OFIB | - | IF UP |
| IF UP | PRUF | - | look up NNOLQ | IF UP |
| IF UP | PLUF | No route | discardFrame | IF UP |
| IF UP | PLUF | NNOL queue exists | sendToQueue | IF UP |
| IF UP | PLUF | Route w/ no NNOLQ but can create | createQueue and sendToQueue | IF UP |
| IF UP | PLUF | Route w/ no NNOLQ and cannot create | discardFrame | IF UP |
| IF UP | NNOLQ IDLE | - | reapNNOLQ | IF UP |
| IF UP | NNOLQ RFD | NNOLQ pending deletion | deleteNNOLQ | IF UP |
| IF UP | NNOLQ RFD | !NNOLQ pending deletion | - | IF UP |

| EXAMPLES OF CONDITION DEFINITIONS FOR THE UISM ||
|---|---|
| Condition | Definition |
| No route | Computed by examining the OFIB lookup result. |
| NNOL queue exists | Computed by examining the OFIB lookup result. |
| Route w/ no NNOLQ but can create | Computed by examining the OFIB lookup result and remaining available space for additional NNOLQ entities. |
| Route w/ no NNOLQ but cannot create | Computed by examining the OFIB lookup result and remaining available space for additional NNOLQ entities. |
| Entry exists in OFIB | Computed by examining the OFIB map |
| No entry exists in OFIB | Computed by examining the OFIB map |
| NNOLQ pending deletion | Computed by looking at the MHLQ Map and seeing if the NNOLQ is tagged as such |

| EXAMPLES OF STATE DEFINITIONS FOR THE NNOLQ SM ||
|---|---|
| State | Definition |
| INIT | Initial state when machine is created. Used when initializing the machine. Not reachable after initialization. |
| IDLE | Waiting for frames to queue. No timer running. This machine could be reaped if needed. |
| ACTIVE | Frames are queued and the machine is waiting for either the timer to expire to release the block or the queue to exceed the threshold. |
| PENDING-DEACTIVATE | An active NNOLQ that has been told to deactivate. It will linger until the current messages are handled, so it moves to this state until it is emptied. Once emptied, it will inform the UISM that the NNOLQ is ready for deletion. |
| DEACTIVATED | An NNOLQ that is no longer usable, and is pending final release from the UISM. |

| EXAMPLES OF EVENT DEFINITIONS FOR THE NNOLQ SM ||
|---|---|
| Event | Definition |
| OBFrame | An outbound frame has been queued from the upper interface state machine. It includes initialized hop count and re-transmit count variables. |
| Release Timer expires | The timer started to group frames into a block has expired. |
| IDLE Timer expires | The timer started to track when the NNOLQ is not in use has expired. |
| Reap NHQL | The UISM has requested that this NNOLQ be deactivated in preparation for deletion. |
| Delete NNOLQ | The UISM has requested that the NNOLQ to be deleted. This occurs after the NNOLQ has already acknowledged a request to prepare to be reaped. |

| \ EXAMPLES OF TRANSITION ACTION DEFINITIONS FOR THE UISM ||
|---|---|
| Action | Definition |
| initOFIB | Initialize OFIB. Include a broadcast address match (ff-..-ff) and a link-local broadcast address match (80-00..00-01). Init NNOLQ for these entries. |
| activateInterface | Obtain any resources not obtained during initOFIB. |
| deactivateInterface | Release all resources (e.g. queued packets) |
| lookupNNOLQ | Look into the NNOL Queue based on the destination MAC address of the upper layer frame. If an NNOL is found, look up the NNOLQ reference to see if it exists. |
| discardFrame | Release frame from memory and do not process any further. |
| sendFrameToQueue | Send frame to NNOLQ state machine. NNOL is not needed to be included, since it is part of the state of the NNOLQ. Initialize the OBX hop-count and OBX re-transmit counters to zero. |
| createQueueAndSendFrame | Create a new NNOLQ state machine, register it with the appropriate map, and then send the frame to this machine. Initialize the OBX hop-count and OBX re-transmit counters to zero. |
| createOFIBEntry | Create OFIB entry. |
| updateOFIBEntry | Update OFIB entry. |
| removeOFIBEntry | Remove OFOB entry. |
| reapNNOLQ | Mark this NNOLQ as 'pendingDeletion'. Send the NNOLQ a message to prepare to be deleted. This is the second message in a three-way handshake to ensure that both state machines are in sync on the removal of the NNOLQ. |
| deleteNNOLQ | Delete the NNOLQ from internal data structures. This NNOLQ has been confirmed as idle internally and has already been marked as 'pendingDeletion' at this level. |

FIG. 9E

EXAMPLES OF STATE TRANSITIONS FOR THE NNOLQ SM

| State | Event | Condition | Action | Next State |
|---|---|---|---|---|
| INIT | - | - | initNNOLQ | IDLE |
| IDLE | OBFrame | - | stopIDLETimer-startReleaseTimer-AndQueueFrame | ACTIVE |
| IDLE | Release Timer Expires | - | - | IDLE |
| IDLE | IDLE Timer expires | - | notifyUISM | IDLE |
| IDLE | Reap NNOLQ | - | prepareForDeletion | DEACTIVED |
| IDLE | Delete NNOLQ | - | - | IDLE |
| ACTIVE | OBFrame | queueBelowCapacity | queueFrame | ACTIVE |
| ACTIVE | OBFrame | queueAtCapacity | queueFrame-StopTimer-AndReleaseBlock | IDLE |
| ACTIVE | Release Timer Expires | - | releaseBlock | IDLE |
| ACTIVE | IDLE Timer expires | - | - | ACTIVE |
| ACTIVE | Reap NNOLQ | - | - | PENDING-DEACTIVATE |
| ACTIVE | Delete NNOLQ | - | - | ACTIVE |
| PENDING-DEACTIVATE | OBFrame | queueBelowCapacity | queueFrame | PENDING-DEACTIVATE |
| PENDING-DEACTIVATE | OBFrame | queueAtCapacity | queueFrame-StopTimer-AndReleaseBlock | DEACTIVATE |
| PENDING-DEACTIVATE | Release Timer Expires | - | releaseBlock | DEACTIVATE |
| PENDING-DEACTIVATE | Delete NNOLQ | - | - | PENDING-DEACTIVATE |
| DEACTIVATED | Delete NNOLQ | - | delete Self | --- |

| EXAMPLES OF CONDITION DEFINITIONS FOR THE NNOLQ SM | |
|---|---|
| Condition | Definition |
| queueBelowCapacity | unreleasedFrameCount < blockReleaseThreshold - 1 |
| queueAtCapacity | unreleasedFrameCount == blockReleaseThreshold - 1 |

| EXAMPLES OF TRANSITION ACTION DEFINITIONS FOR THE NNOLQ SM | |
|---|---|
| Action | Definition |
| initNNOLQ | Initialize the NNOLQ state. Set the unreleasedFrame count to zero (0). Create the frame queue. |
| startTimerAndQueueFrame | Start the block-release timer. Queue the frame. |
| queueFrame | Queue the frame. |
| queueFrameStopTimer-AndReleaseBlock | Queue the frame. Stop the timer. Create a TransmitBlock and send it to the Transmit Scheduler SM. Start the IDLE timer. |
| releaseBlock | Create a TransmitBlock and send it to the Transmit Scheduler SM. Start the IDLE timer. |
| notifyUISM | Send a message to the USIM that the NNOLQ has been marked for deactivation. |
| delete Self | Release all resources, stop the timers, and delete the NNOLQ |

FIG. 10E

| EXAMPLES OF STATE TRANSITIONS FOR THE TX-BLOCK SCHEDULER SM | | | | |
|---|---|---|---|---|
| State | Event | Condition | Action | Next State |
| INIT | - | - | initScheduler | READY |
| READY | blockReady | - | queueBlockAnd StartCATimer | ACQUIRE |
| READY | channelBusy | | | CHANNEL BUSY |
| READY | channelIdle | - | - | READY |
| CHANNEL BUSY | blockReady | - | queueBlock | CHANNEL BUSY |
| CHANNEL BUSY | channelIdle | CATimer paused | resume NAV TIMER | ACQUIRE |
| CHANNEL BUSY | channelIdle | CATimer not paused & queueEmpty | - | READY |
| CHANNEL BUSY | channelIdle | CATimer not paused & !queueEmpty | startCaTimer | ACQUIRE |
| CHANNEL BUSY | channelBusy | - | | CHANNEL BUSY |
| ACQUIRE | blockReady | - | queueBlock | ACQUIRE |
| ACQUIRE | channelBusy | - | pauseCATimer | CHANNEL BUSY |
| ACQUIRE | CaTimer Expired | - | transmitBlock | WAIT |
| WAIT, IDLE | blockReady | - | queueBlock | WAIT, IDLE |
| WAIT, IDLE | channelIdle | - | - | WAIT, IDLE |
| WAIT, IDLE | channelBusy | - | - | WAIT, BUSY |
| WAIT, IDLE | FinalFrame-Released | additionalBlocks Pending | startCATimer | ACQUIRE |
| WAIT, IDLE | FinalFrame-Released | noAdditionalBlocks Pending | - | READY |
| WAIT, BUSY | BlockReady | - | queueBlock | WAIT, BUSY |
| WAIT, BUSY | channelIdle | - | - | WAIT, IDLE |
| WAIT, BUSY | channelBusy | - | - | WAIT, BUSY |
| WAIT, BUSY | FinalFrame-Released | additionalBlocks Pending | - | CHANNEL BUSY |
| WAIT, BUSY | FinalFrame-Released | noAdditionalBlocks Pending | - | READY |

| EXAMPLES OF STATE DEFINITIONS FOR THE TX-BLOCK SCHEDULER SM ||
|---|---|
| State | Definition |
| INIT | Initial state when machine is created. Used when initializing the machine. Not reachable after initialization. |
| READY | Waiting for blocks to transmit |
| ACQUIRE | Waiting for transmit opportunity |
| CHANNEL_BUSY | Channel has active transfer of block; wait for it to complete. |
| WAIT | Waiting for lower layer to confirm frame released |

| EXAMPLES OF EVENT DEFINITIONS FOR THE TX-BLOCK SCHEDULER SM ||
|---|---|
| Event | Definition |
| BlockReady | A block has been submitted for transmission. |
| ReceiveFrame | A lower-layer frame has been received. This notification is used to adjust the back-off timer. Note: this notification is done in parallel with the delivery of a frame to a transmit-block or receive-block engine. |
| TimerExpired | The timer has expired and the block can be transmitted. |
| FinalFrameReleased | An indication from the lower layer that the final frame of a block has been transmitted. |

| EXAMPLES OF CONDITION DEFINITIONS FOR THE TX-BLOCK SCHEDULER SM ||
|---|---|
| Condition | Definition |
| additionalBlocksPending | The queue of blocks to transmit is not empty. |
| noAdditionalBlocksPending | the queue of blocks to transmit is empty. |

| EXAMPLES OF TRANSITION ACTION DEFINITIONS FOR THE TX-BLOCK SCHEDULER SM | |
|---|---|
| Action | Definition |
| initScheduler | Init the scheduler state machine. Set the initial NAV to zero (0). Set the CAB to CAB[min]. |
| queueBlockAndStartCATimer | Add the block to the queue and start theCA timer that will cause the block to be transmitted. The specific interval is uniformly distributed between 0 and the value of CAB. |
| queueBlock | Add a block to the queue. The timer is not started, since it is already running. |
| startTimer | Start the timer to handle the next block in the queue. |
| transmitBlock | Format and submit all the frames in a block to the lower layer for transmission. The last frame should be marked to force the lower layer engine to send back a 'FinalFrameReleased' signal when the frame is processed by the lower layer. |
| adjustTimerDuration | This action will adjust the timer duration to reflect |
| adjustActiveTimer | This will adjust the timer for the current block to account for a need to wait for the current block to complete. This may need access to the frame's information to estimate the duration of the current block(s). |

| EXAMPLES OF STATE TRANSITIONS FOR THE CHANNEL ESTIMATOR SCHEDULER SM | | | | |
|---|---|---|---|---|
| State | Event | Condition | Action | Next State |
| INIT | - | - | initChannelEstimator | IDLE |
| IDLE | ReceiveFrame | frameImpactsNAV | updateNAVstartNAVTimer reportChannelBusy | BUSY |
| BUSY | NavTimerExpires | - | reportChannelIdle | IDLE |
| BUSY | ReceiveFrame | frameImpactsNAV | updateNavTimer | BUSY |

| EXAMPLES OF STATE DEFINITIONS FOR THE CHANNEL ESTIMATOR SCHEDULER SM ||
|---|---|
| State | Definition |
| INIT | Initial state when machine is created. Used when initializing the machine. Not reachable after initialization. |

| EXAMPLES OF EVENT DEFINITIONS FOR THE CHANNEL ESTIMATOR SCHEDULER SM ||
|---|---|
| Event | Definition |
| Receive Frame | Receive an frame from the lower layer |
| NavTimerExpired | NAV Timer expired |

| EXAMPLES OF CONDITION DEFINITIONS FOR THE CHANNEL ESTIMATOR SCHEDULER SM ||
|---|---|
| Condition | Definition |
| frameImpactsNAV | The received frame updates the NAV computation. This may be a new transmitter, or an updated TOA for an anticipated frame that revises the NAV expiration. |

| EXAMPLES OF TRANSITION ACTION DEFINITIONS FOR THE CHANNEL ESTIMATOR SCHEDULER SM ||
|---|---|
| Action | Definition |
| initChannelEstimator | Initialize the Channel Estimator. Set the NAV to zero. |
| updateNAVstartNAVTimer and reportChannel Busy | Update the NAV value based on the latest frame. Revise the expiration time for the NAV Timer to match. Send an indication that the channel has transitioned to BUSY to the transmit block scheduler state machine. |
| reportChannelIdle | Send an indication that the channel has transitioned to IDLE to the transmit block scheduler state machine. |

| EXAMPLES OF STATE TRANSITIONS FOR THE LISM |||||
|---|---|---|---|---|
| State | Event | Condition | Action | Next State |
| INIT | - | - | initBlockMap | READY |
| READY | OBXFrame | NNOL includes self (which includes broadcast DA) | lookupBlock | READY |
| READY | OBXFrame | NNOL does not include self | discardFrame | READY |
| READY | PUL-OBXFrame | no existing Block & frameType == ACK | discardFrame | READY |
| READY | PUL-OBXFrame | no Existing Block && frameType == DATA | createRxBlock-AndAddData | READY |
| READY | PUL-OBXFrame | existingBlock && frameType == DATA and blockType == RX | addDataToBlock | READY |
| READY | PUL-OBXFrame | existingBlock && frameType == DATA && blockType == TX | discardFrame | READY |
| READY | PUL-OBXFrame | existingBlock && frameType == ACK && blockType == TX | addAckToBlock | READY |
| READY | PUL-OBXFrame | existingBlock && frameType == ACK && blockType == RX | discardFrame | READY |

| EXAMPLES OF STATE DEFINITIONS FOR THE LISM ||
|---|---|
| State | Definition |
| INIT | Initial state when machine is created. Used when initializing the machine. Not reachable after initialization. |
| READY | Normal operating state. |

| EXAMPLES OF EVENT DEFINITIONS FOR THE LISM ||
|---|---|
| Event | Definition |
| OBXFrame | Frame received for our ETHERTYPE from lower layer. |
| PLU-OBXFrame | Post lookup frame. Frame augmented with information about the associated Block that the frame belongs to. |

FIG. 13C

| EXAMPLES OF CONDITION DEFINITIONS FOR THE LISM |
|---|
| Condition |
| NNOL includes self (broadcast DA included) |
| NNOL does not include self |
| no existing Block & frameType == ACK |
| no Existing Block && frameType == DATA |
| existingBlock && |
| frameType == DATA and |
| blockType == RX |
| existingBlock && |
| frameType == DATA && blockType == TX |
| existingBlock && |
| frameType == ACK && blockType == TX |
| existingBlock && |
| frameType == ACK && |
| blockType == RX |

FIG. 13D

| EXAMPLES OF TRANSITION ACTION DEFINITIONS FOR THE LISM ||
|---|---|
| Action | Definition |
| initBlockMap | Iniitalize block map. Create initial blocks for RX on broadcast addresses (network-wide and link-local). |
| lookupBlock | Look into the block Map to find the appropriate block state machine for the packet involved. |
| createRxBlock-AndAddData | Create RX block and add data. |
| addDataToBlock | Add data to block. |
| addAckToBlock | Add ACK to block. |
| discardFrame | Discard frame. |

FIG. 13E

| EXAMPLES OF STATE TRANSITIONS FOR THE TX-BLOCK SM ||||| 
|---|---|---|---|---|
| State | Event | Condition | Action | Next State |
| INIT | - | - | initTransmitBlock | PRETX |
| PRETX | ACKFrame | - | discardFrame | PRETX |
| PRETX | addFrame | - | addFrameToBlock | PRETX |
| PRETX | releaseBlock | - | transmitBlock-AndStartFinalizeTimer | POSTTX |
| POSTTX | ACKFrame | - | processAckFrame | POSTTX |
| POSTTX | finalizeTimer Expired | - | reSubmitUnAckedFrames | FINI |
| FINI | - | - | - | FINI |

FIG. 14A

| EXAMPLES OF STATE DEFINITIONS FOR THE TX-BLOCK SM ||
|---|---|
| State | Definition |
| INIT | Initial state when machine is created. Used when initializing the machine. Not reachable after initialization. |
| PRETX | The transmit block is being assembled. |
| POSTTX | The transmit block has been queued for transmission. It is waiting to process ACKs and the 'finalize' timer. |

FIG. 14B

| EXAMPLES OF EVENT DEFINITIONS FOR THE TX-BLOCK SM ||
|---|---|
| Event | Definition |
| ACKFrame | An OBX ACK frame to be processed for this block. |
| addFrame | An external event to add an outbound frame to the block. |
| releaseBlock | An external event to cause the block to be released to the lower layer. |
| finalizeTimerExpired | The timer to finalize the status of frames within this block expired. |

FIG. 14C

| EXAMPLES OF TRANSITION ACTION DEFINITIONS FOR THE TX-BLOCK SM ||
|---|---|
| Action | Definition |
| initTransmitBlock | Initialize transmit block |
| discardFrame | Discard frame. |
| addFrameToBlock | Add frame to block. |
| transmitBlock-AndStartFinalizeTimer | Transmit block and start finalize timer. |
| processAckFrame | Process ACK frame. |
| reSubmitUnAckedFrames | Resubmit unACKed frames |

FIG. 14D

| EXAMPLES OF STATE TRANSITIONS FOR THE RX-BLOCK SM |||||
|---|---|---|---|---|
| State | Event | Condition | Action | Next State |
| INIT | - | - | initReceiveBlock | READY |
| READY | DataFrame | destinationAddress == self | markAsReceived-PassToUpperLayer-UpdateAckTimer | READY |
| READY | DataFrame | destinationAddress != self | addToBlock-AndUpdateAckTimer | READY |
| READY | AckFrame | completesHigherPriority-AckSet | processAckAnd-TransmitAckAnd-ForwardFrames | FINI |
| READY | AckFrame | still pending higher priority ACK | processAck | READY |
| READY | ACK Timer Expired | - | transmitAck-AndForwardFrames | FINI |

| EXAMPLES OF STATE DEFINITIONS FOR THE RX-BLOCK SM ||
|---|---|
| State | Definition |
| INIT | Initial state when machine is created. Used when initializing the machine. Not reachable after initialization. |
| READY | Normal operating state |
| FINI | Ready to be reaped or re-used |

| EXAMPLES OF EVENT DEFINITIONS FOR THE RX-BLOCK SM ||
|---|---|
| Event | Definition |
| DataFrame | Data frame with self in address list. |
| AckFrame | Ack Frame for this block. |

| EXAMPLES OF CONDITION DEFINITIONS FOR THE RX-BLOCK SM |
|---|
| Condition |
| destinationAddress == self |
| destinationAddress != self |
| completesHigherPriorityAckSet |
| remainingHigherPriorityAcks |

| EXAMPLES OF TRANSITION ACTION DEFINITIONS FOR THE RX-BLOCK SM | |
|---|---|
| Action | Definition |
| initReceiveBlock | Initialize receive block. No specific structures are initialized. to special values. |
| markAsReceived-PassToUpperLayer-UpdateAckTimer | Record the data frame as having been received, but pass immediately to upper layer. Update ACK timer based on expected end of block calculation. |
| addToBlock-AndUpdateAckTimer | Add a data frame to the receiver list of received frames. Update ACK timer based on expected end of block calculation |
| processAck | Update ACK map to include other NNOL member's information. |
| transmitAck-AndForwardFrames | Transmit ACK and forward frames |

FIG. 15E

SYSTEM FOR DATA TRANSFER IN A WIRELESS NETWORK

CROSS REFERENCE TO RELATED APPLICATIONS

This application claims the benefit of U.S. Provisional Application No. 60/875,371 filed Dec. 18, 2006, the contents of which are incorporated herein by reference.

BACKGROUND OF INVENTION

1. Field of Invention

The present invention is generally directed to a system for data transfer in an electronic network, and more particularly, to a system for reliably transferring blocks of data in an electronic wireless network.

2. Description of the Related Art

Wired networks focus on managing the queues within routers and assume that the links between routers are either working (99.9% or better packet delivery rate) or failing (0% packet delivery rate). The routers in a wired network work efficiently to process packets with minimum latency, optimize the use of routes for transmission, and anticipate and avoid queue overflows through a variety of mechanisms.

Wireless networks, however, differ substantially from wired networks. Ad-hoc wireless networks with mobile nodes experience packet delivery rates (PDRs) that vary substantially over relatively short time periods. Nodes might be able to communicate with one set of nodes at one moment and then are only able to reach a subset of these nodes a short time later. Wireless networks have substantially lower capacity and the latency for media access control is substantially higher than for the links of high-performance wired routes. These differences substantially alter the landscape for optimal protocol design.

Traditional networking engines place the routing decision primarily at the transmitter. As a router processes packets, the transmitter considers network topology and decides which node is the best choice for the next hop for each packet and then transmits the packet to this specific node. For wireless networks with highly dynamic channels, a choice made according to an approach designed for a wired network may not be the right choice at the time the decision is made. In fact, the communications channels between the nodes can experience a change faster than the node is able to sense. When this occurs, the decisions being made may only be appropriate for a condition that no longer exists.

For example, optimized link state routing protocol (OLSR/OSLR-RFC) with link-quality monitoring is nominally configured with a response time of several seconds. With the HELLO interval set to one second and a measurement window of 10 frames, OLSR computes the link quality over a sliding ten second window based on measurements taken once a second. If a link changes to a 10% PDR for 5 seconds and then recovers, it would take OLSR more than 3 seconds to recognize that the link quality is below 70% PDR and about 10 seconds to realize the full extent of the change in the link's PDR. If OLSR has a threshold set at 70% PDR for causing a change to the OLSR routing table, the change would not be triggered until at least 3 seconds of poor link performance were measured. It would then take OLSR several seconds to propagate this change and start to react. By the time this has all happened, the original example channel disturbance lasting 5 seconds would have already passed.

SUMMARY OF THE INVENTION

Embodiments of the present invention provide a wireless network protocol that addresses the problems that may result from frequent changes in communications channels as described above. The embodiments employ a layer 2 mesh protocol, referred to herein as opportunistic block transfer protocol, designed for wireless networks and their particular characteristics. In particular, the embodiments employ a hop-by-hop block formation approach in which data packets are organized into data blocks at each hop according to a routing table and are transmitted to each hop as data blocks.

For example, data packets to be transmitted from a source node to a destination are grouped into a data block associated with a routing table. The source node transmits the data packets according to the routing table. Each node in the routing table determines which data packets it must transmit to other nodes to complete transmission of the data packets to the destination. Each such node determines a new routing table and groups these data packets into a new data block associated with the new routing table. Each node transmits the data packets of the new data block according to the new routing table in a manner similar to the source node, and the process essentially repeats with the goal of completing transmission of the data packets to the destination.

In a particular embodiment, a source node receives a plurality of data packets to be transmitted to a destination node. The data packets are grouped into a data block associated with a routing table. The routing table includes the destination node and intermediate nodes which define a network route between the source node and the destination node. The destination node and intermediate nodes in the routing table may be ranked, with the destination node having the highest rank. The source node then transmits the data packets according to the routing table. Each node in the routing table transmits an acknowledgment indicating which of the data packets it received. In some embodiments, the acknowledgment may further indicate which data packets were received by nodes having a higher ranking in the routing table. Furthermore, in other embodiments, the nodes in the routing table transmit their acknowledgments in a sequence based on rankings in the first routing table. The source node re-transmits the data packets which were not received by any of the nodes in the routing table. Meanwhile, each node in the routing table, except the destination node, determines which data packets have not been acknowledged by any nodes having a higher rank in the routing table. Each such node then determines a new routing table defining another network route to the destination node and groups the unacknowledged packets into a new data block associated with the new routing table. Each such node then transmits the subset of packets according to the new routing table in a manner similar to the source node. Thus, the nodes at each hop employ a routing table to group packets heading towards the next set of nodes.

Still other aspects, features, and advantages of the present invention are readily apparent from the following detailed description, by illustrating a number of exemplary embodiments and implementations, including the best mode contemplated for carrying out the present invention. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE FIGURES

FIG. 8A provides an example of the fields and corresponding values that may be employed in frames according to opportunistic block transfer protocol.

FIG. 8B provides additional fields and corresponding values for ACK frames according to opportunistic block transfer protocol.

FIG. 8C provides additional fields and corresponding values for INFO frames according to opportunistic block transfer protocol.

FIG. 9A illustrates examples of state transitions for the UISM illustrated in FIG. 7.

FIG. 9B illustrates examples of state definitions for the UISM illustrated in FIG. 7.

FIG. 9C illustrates examples of event definitions for the UISM illustrated in FIG. 7.

FIG. 9D illustrates examples of condition definitions for the UISM illustrated in FIG. 7.

FIG. 9E illustrates examples of transition action definitions for the UISM illustrated in FIG. 7.

FIG. 10A illustrates examples of state transitions for the NNOLQ SM illustrated in FIG. 7.

FIG. 10B illustrates examples of state definitions for the NNOLQ SM illustrated in FIG. 7.

FIG. 10C illustrates examples of event definitions for the NNOLQ SM illustrated in FIG. 7.

FIG. 10D illustrates examples of condition definitions for the NNOLQ SM illustrated in FIG. 7.

FIG. 10E illustrates examples of transition action definitions for the NNOLQ SM illustrated in FIG. 7.

FIG. 11A illustrates examples of state transitions for the tx-block scheduler SM illustrated in FIG. 7.

FIG. 11B illustrates examples of state definitions for the tx-block scheduler SM illustrated in FIG. 7.

FIG. 11C illustrates examples of event definitions for the tx-block scheduler SM illustrated in FIG. 7.

FIG. 11D illustrates examples of condition definitions for the tx-block scheduler SM illustrated in FIG. 7.

FIG. 11E illustrates examples of transition action definitions for the tx-block scheduler SM illustrated in FIG. 7.

FIG. 12A illustrates examples of state transitions for the channel estimator scheduler SM illustrated in FIG. 7.

FIG. 12B illustrates examples of state definitions for the channel estimator scheduler SM illustrated in FIG. 7.

FIG. 12C illustrates examples of event definitions for the channel estimator scheduler SM illustrated in FIG. 7.

FIG. 12D illustrates examples of condition definitions for the channel estimator scheduler SM illustrated in FIG. 7.

FIG. 12E illustrates examples of transition action definitions for the channel estimator scheduler SM illustrated in FIG. 7.

FIG. 13A illustrates examples of state transitions for the LISM illustrated in FIG. 7.

FIG. 13B illustrates examples of state definitions for the LISM illustrated in FIG. 7.

FIG. 13C illustrates examples of event definitions for the LISM illustrated in FIG. 7.

FIG. 13D illustrates examples of condition definitions for the LISM illustrated in FIG. 7.

FIG. 13E illustrates examples of transition action definitions for the LISM illustrated in FIG. 7.

FIG. 14A illustrates examples of state transitions for the tx-block SM illustrated in FIG. 7.

FIG. 14B illustrates examples of state definitions for the tx-block SM illustrated in FIG. 7.

FIG. 14C illustrates examples of event definitions for the tx-block SM illustrated in FIG. 7.

FIG. 14D illustrates examples of transition action definitions for the tx-block SM illustrated in FIG. 7.

FIG. 15A illustrates examples of state transitions for the rx-block SM illustrated in FIG. 7.

FIG. 15B illustrates examples of state definitions for the rx-block SM illustrated in FIG. 7.

FIG. 15C illustrates examples of event definitions for the rx-block SM illustrated in FIG. 7.

FIG. 15D illustrates examples of condition definitions for the rx-block SM illustrated in FIG. 7.

FIG. 15E illustrates examples of transition action definitions for the rx-block SM illustrated in FIG. 7.

DETAILED DESCRIPTION

Figure 1:
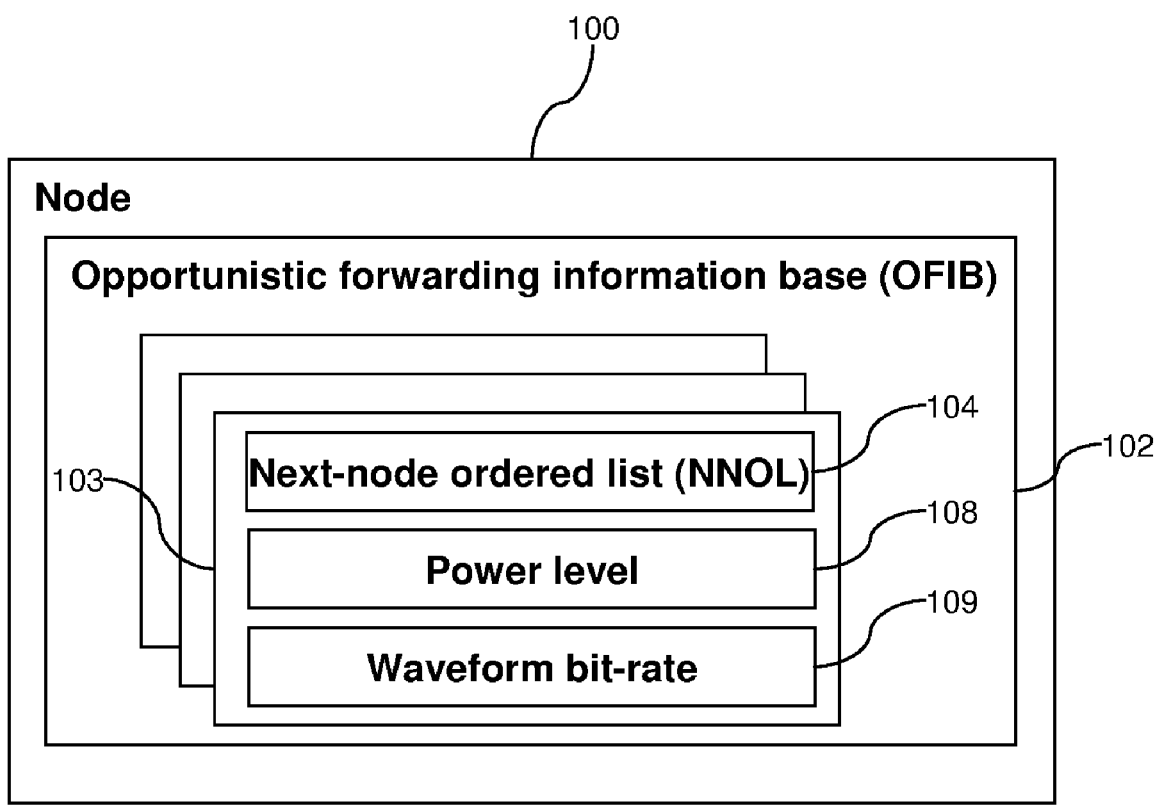
FIG. 1 illustrates a diagram of a node in an embodiment employing opportunistic block transfer protocol.

Embodiments of the present invention generally employ a network protocol referred to herein as opportunistic block transfer protocol. In some aspects, the embodiments improve on the ExOR protocol, which optimizes packet transport by initially using source-based opportunistic forwarding of packet blocks and then reverting to traditional routing techniques once the blocks diffuse when traversing the network. A network using the ExOR protocol groups packets to be transported as blocks that are carried end-to-end across the network. These blocks are broadcast at the link layer and contain an ordered set of addresses that represent the end-to-end route the group of packets should take. When receivers send back acknowledgement messages (ACKs) to indicate which packets they have received, the acknowledgement information is used to identify which nodes will take responsibility for forwarding each packet within the group. In other words, after ExOR initially broadcasts each packet, it selects which receiver will forward the packet only after determining from the ACK messages which set of nodes actually received the packet. This process ends up diffusing the block of packets into a collection of smaller blocks to be sent across the network, with each smaller block now being the responsibility of the node currently holding the packet. As the number of packets of a group at a specific transmitting node shrinks, ExOR processing reverts to traditional hop-by-hop forwarding. This modal operation avoids the inefficiencies of operating ExOR with small blocks.

In accordance with aspects of the present invention, opportunistic block transfer protocol substantially simplifies the design of ExOR by employing a single unified approach rather than a modal operation. In other words, opportunistic block transfer protocol avoids the modal and end-to-end routing approach of ExOR and provides a new self-sufficient mode for link-layer transport that performs decisions hop-by-hop. ExOR teaches away from the approach of opportunistic block transfer protocol, because the end-to-end approach of ExOR causes the blocks to diffuse as they traverse the network, and the inefficiencies presented by block diffusion strongly suggest that a modal approach and traditional hop-by-hop forwarding of the smaller blocks is necessary. Opportunistic block transfer protocol, however, produces heretofore unexpected results by addressing the problem of block diffusion with a hop-by-hop block formation approach. Rather than identifying a block a single time as the packets enter the network as taught by ExOR, opportunistic block transfer protocol identifies blocks at each hop. To accomplish this, opportunistic block transfer protocol does not look at the destination address of the block, as ExOR does, but instead looks at a routing table, or node list, to group packets heading towards the next set of nodes. Advantageously, opportunistic block transfer protocol is simpler to implement and performs more efficiently over larger networks than ExOR.

Referring to FIG. 1, a diagram of a node 100 in an embodiment employing opportunistic block transfer protocol is illustrated. The node 100 has entries 103 associated with an opportunistic forwarding information base (OFIB) 102. The OFIB 102 contains a set of destination addresses. For example, fully-qualified MAC addresses are used for mesh operation. Rather than being associated with a single next-hop address as in traditional routing, each OFIB entry 103 is associated with a list of next-node addresses in a preferred order, also known as a next-node ordered list (NNOL) 104. As with traditional IP packet handling, the routing table is populated by a routing protocol. Each OFIB entry 103 also has an associated power level 108 and an associated waveform bitrate 109 to use when transmitting.

Figure 2:
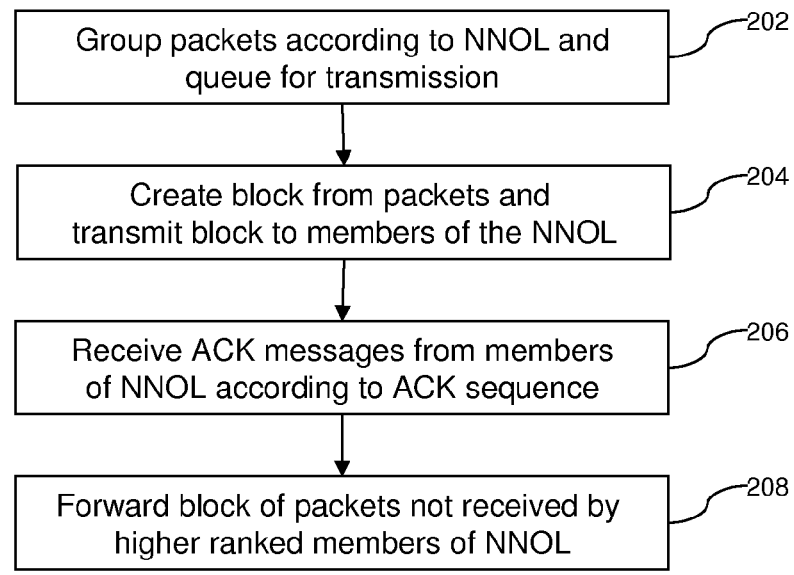
FIG. 2 illustrates an example process for handling packets according to opportunistic block transfer protocol.

Employing nodes 100 with the configuration shown in FIG. 1, packets may be handled according to opportunistic block transfer protocol, as generally illustrated by the process 200 of FIG. 2. Specifically, in step 202, packets handed down to a communications interface of a transmitter are grouped according to their NNOL and queued for transmission. In step 204, after waiting a blocking interval from the arrival of the first packet corresponding to an NNOL, a block is created and transmitted by the transmitter. The transmission is achieved by link-layer broadcast and is addressed to the members of the NNOL at an opportunistic block transfer protocol layer. In step 206, at the end of the block transmission, the members of the NNOL send back ACK messages via link-layer broadcast according to an ACK sequence.

Figure 3:
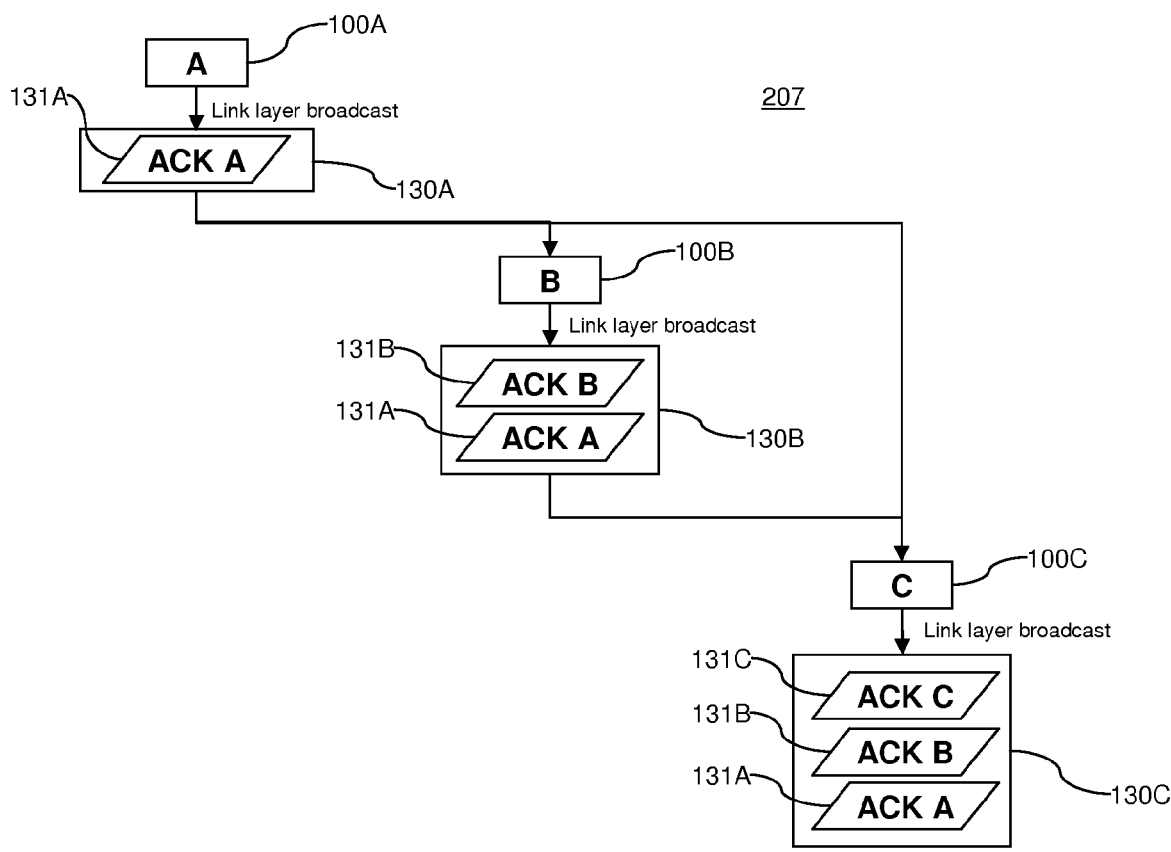
FIG. 3 illustrates an example ACK sequence for nodes according to opportunistic block transfer protocol.

FIG. 3 shows a diagram of an example ACK sequence 207 for nodes 100A, 100B, 100C, etc. in a particular NNOL. Initially, node 100A, the first preferred node in the NNOL, sends an ACK message 131A in ACK frame 130A via link layer broadcast indicating which packets in the block it has received. The next preferred node 100B then sends an ACK message 131B in ACK frame 130B via link layer broadcast, indicating which packets it has received. In addition, node 100B also sends, in the ACK frame 130B, the ACK message 131A it has heard from node 100A. Similarly, the next node 100C sends an ACK message 131C in ACK frame 130C via link layer broadcast, indicating which packets it has received. In addition, node 100C also sends, in the ACK frame 130C, the ACK messages 131A and 131B it has heard from nodes 100A and 100B, respectively. The sequence continues with each subsequent node in the NNOL providing ACK information on the packets it has received along with ACK messages it has heard from the previous nodes. The technique illustrated in FIG. 3 increases the likelihood that the NNOL members can determine which packets in the block have been received by each node. This technique is also further illustrated in examples detailed below.

Referring again to FIG. 2, in step 208, each node in the NNOL forwards, as a block, the packets that were not received by previous members of the NNOL in the ACK sequence, i.e. members in the NNOL having a higher rank than the particular node. The transmitter is responsible for sending packets that were not acknowledged by any member in the NNOL.

In the embodiment of FIG. 2, the measured packet delivery rate (PDR) to NNOL members is made available to the routing engine to adjust the OFIB as appropriate. In addition, once packets arrive at a new node, they are again evaluated to determine the appropriate NNOL. To avoid simple loops, the NNOL from the OFIB has the source of the packet removed from the NNOL. A hop-count (HC) is used to determine the time-to-live (TTL) for each packet. As such, the HC of packets is decremented when the packets are re-queued. If the HC is zero for a packet, then the packet will be discarded instead of being forwarded.

The address in opportunistic block transfer protocol may all be 48-bit quantities. As such, opportunistic block transfer protocol may use IEEE 802 addresses in the OFIB.

Figure 4:
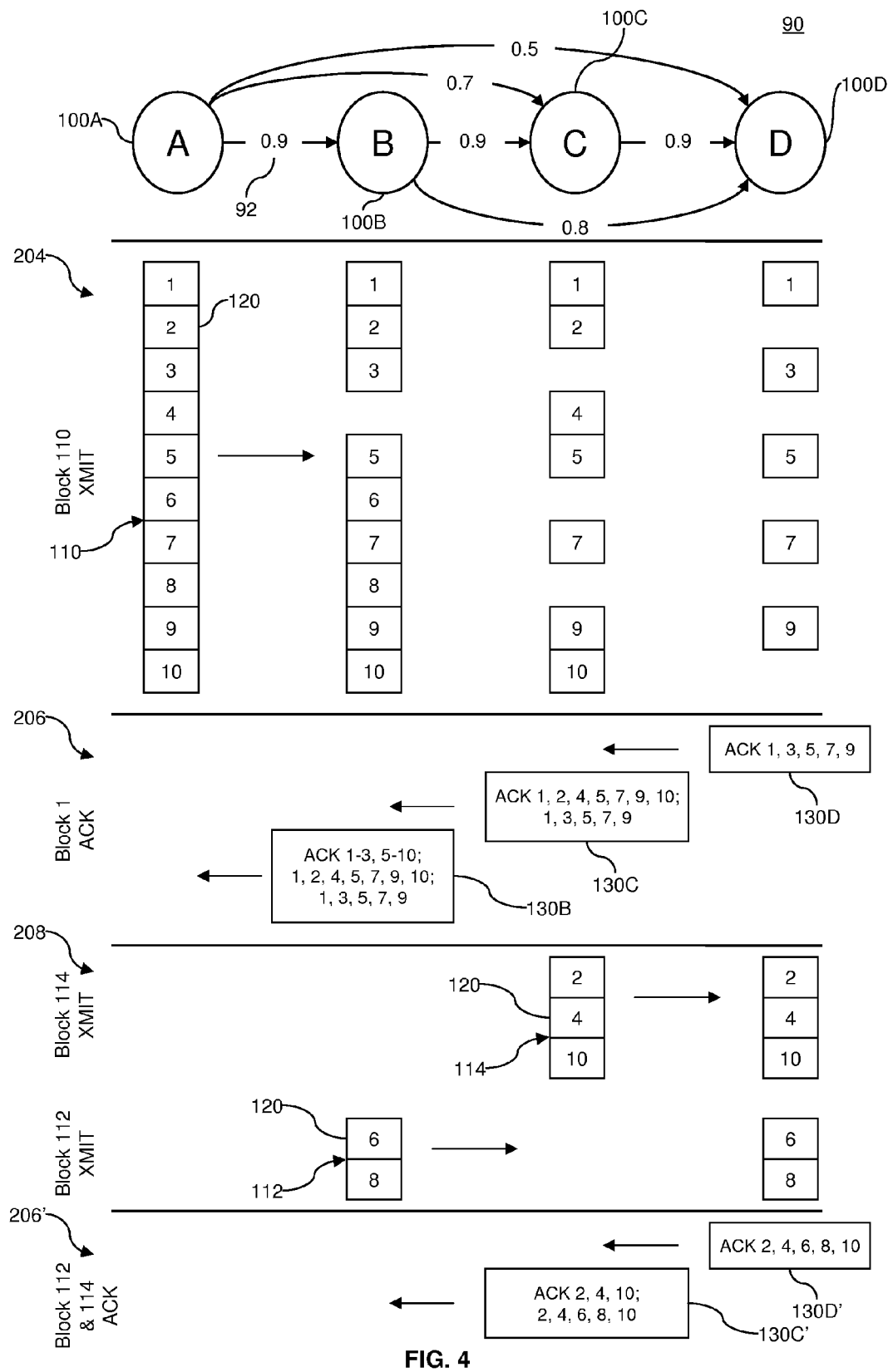
FIG. 4 illustrates an example of how the process of FIG. 2 may be implemented.

FIG. 4 provides an example of how the process of FIG. 2 may be implemented. In particular, a small collection of nodes 100A, 100B, 100C, and 100D in a wireless network 90 are shown with a packet delivery rate 92 between each pair of nodes. For example, the packet delivery rates 92 between nodes 100A and 100B, between nodes 100B and 100C, and between 100C and 100D are all 0.9; the packet delivery rate 92 between nodes 100A and 100C is 0.7; the packet delivery rate 92 between nodes 100A and 100D is 0.5; and the packet delivery rate 92 between nodes 100B and 100D is 0.8. As shown in step 204 of FIG. 4, ten data frames 120 grouped into block 110 are transported across the network 90. The frames 120 in FIG. 4 are labeled from 1-10 for reference. The sequence starts with node 100A sending the ten frames 1-10 as a block 110 destined for node 100D. Node 100A is referred to as a transmitting node, or transmitter. To traverse the network 90 according to opportunistic block transfer protocol, the system through its routing protocol determines that the long-term delivery efficiency to node 100D can be improved if nodes 100B and 100C are also employed. Accordingly, the frames 1-10 are transmitted with a NNOL that includes, in preferred order, node 100D, then 100C, and then 100B. Nodes 100B, 100C, and 100D are referred to as receiving nodes, or receivers. When the frames 1-10 are transmitted from node 100A, nodes 100B, 100C, and 100D receive some or all frames 1-10. FIG. 4 illustrates which frames 120 of the block 110 were successfully received by each node 100B, 100C, and 100D in step 204. For example, node 100B successfully receives frames 1-3 and 5-10; node 100C successfully receives frames 1-2, 4-5, 7, and 9-10; and node 100D successfully receives frames 1, 3, 5, 7, and 9.

As further shown in step 206 in FIG. 4, once node 100A completely transmits the block 110, the nodes 100D, 100C, and 100B, starting with the most preferred node 100D, send back ACK frames 130D, 130C, and 130B, respectively. The ACK frame 130D includes an ACK message from node 100D acknowledging that node 100D has received frames 1, 3, 5, 7, and 9. Nodes 100C, 100B, and 100A hear the ACK message in ACK frame 130D transmitted from node 100D. Node 100C prepares ACK frame 130C which includes an ACK message acknowledging that it has received frames 1-2, 4-5, 7, and 9-10. When node 100C prepares the ACK frame 130C, it also includes the ACK message from node 100D in ACK frame 130D. Nodes 100B and 100A hear the ACK information transmitted in frame 130C from node 100C. Node 100B prepares ACK frame 130B which includes and ACK message acknowledging that it has received frames 1-3 and 5-10. When node 100B prepares the ACK frame 130B, it also includes the ACK information from ACK frames 130C and 130D. Node 100A hears the ACK information in ACK frame 20B transmitted from node 100B. As discussed previously, the technique in step 204 increases the likelihood that the ACK messages from nodes 100B, 100C, and 100D will be heard by the transmitter of the block 110, node 100A.

As illustrated in FIG. 4, once the ACK messages are heard in step 206, each node 100A, 100B, 100C, and 100D then decides in step 208 which frames 1-10 it needs to re-transmit in a new block. In this example, node 100A has heard that all frames 1-10 were received by at least one node in the NNOL, so it does not re-transmit any frames. However, node 100B determines that it needs to transmit frames 6 and 8 as a new block 112, as node 100B received the frames 6 and 8 but nodes 100C and 100D did not. Meanwhile, node 100C determines that it needs to transmit frames 2, 4, and 10 as a new block 114, as node 100C received the frames 2, 4, and 10 but node 100D did not. As discussed previously, once packets arrive at a new node, a new routing evaluation takes place to determine the appropriate NNOL. To avoid simple loops, the NNOL does not contain the source of the packet.

After the two new blocks 112 and 114 have been transmitted in step 208, node 100D in step 206' acknowledges in ACK frame 130D' that it has received frames 6 and 8 and frames 2, 4, and 10 from node 100C. Nodes 100B and 100C hear the ACK message in the ACK frame 130D' transmitted from node 100D. ACK frame 130C' from node 100C acknowledges that it has received frames 6 and 8. When node 100C prepares the ACK frame 130C', it also includes the ACK message from ACK frame 130D'. Node 100B then hears the ACK information in ACK frame 130C transmitted from node 100C. Although not illustrated in FIG. 4 for simplicity, it is understood that the blocks 112 and 114 may have overlapping frames.

Advantageously, in terms of efficiency, the example sequence illustrated by FIG. 4 required seventeen frames to be exchanged. In a traditional network where each frame has DATA and a tightly-coupled ACK (considered part of frame transmission count for simplicity of comparison) and is transported from node to node (100A to 100B, 100B to 100C, 100C to 100D), eleven frames (one re-transmission per ten frames based on a per-hop delivery ratio of 90%) are required to transport the frames from node 100A to node 100B, eleven more frames are required from node 100B to node 100C, and finally eleven additional frames are required to complete the journey from node 100C to 100D. Thus, the traditional approach requires 33 frames to be transmitted instead of seventeen frames under opportunistic block transfer protocol. Under this simplified example, opportunistic block transfer protocol accomplishes the transport with 48% fewer frames. Even if the frames are each 30% larger to accommodate a larger header for opportunistic block transfer protocol, the traditional approach is substantially less efficient. Indeed, in this example, opportunistic block transfer protocol only uses 66% of the capacity required compared to the traditional approach.

Embodiments employing opportunistic block transfer protocol, such as those described above, support unicast transmission. However, in addition to supporting unicast traffic, embodiments can also support link-local broadcasts or network-wide broadcasts. In these alternative cases, the packets are addressed to a unique address and are transmitted as broadcast packets without an NNOL. Link-local broadcasts use a hop-count of one to limit dissemination of the packets. Meanwhile, to support a link-layer network-wide broadcast, each node tracks the recently transmitted broadcast packets (by source and ID) and transmits each received broadcast packet only if it has not already transmitted it.

An ideal block transmission sequence in opportunistic block transfer protocol includes a tightly coupled series of DATA/SIFS/DATA/SIFS followed immediately by ACK/SIFS/ACK/SIFS/ACK. (SIFS refers to short inter-frame spacing and is employed, as a part of the IEEE 802.11 standard, to allow a receiver time to prepare for the arrival of a subsequent frame after the arrival of an initial frame.) The ideal block transmission sequence would allow the transmitter of packets in one block to determine immediately whether the packets were heard by one or more nodes in the NNOL. In addition, the complete block transfer would only require a single over-the-air transaction. Furthermore, a tightly coupled transmission sequence would also block the channel's use by others for an entire DATA/ACK sequence. However, employing commercial off the shelf (COTS) hardware for opportunistic block transfer protocol in some embodiments may present some significant challenges as COTS hardware may not permit tightly coupled transmission sequences and may only permit the use of loosely-coupled interactions instead. It is noted that orthogonal frequency division multiple access (OFDMA)-based waveforms, with multiple concurrent transmissions, may not present the same challenges as a COTS hardware configuration.

To address this challenge presented by COTS hardware, enhanced distributed coordination function (EDCF) may be employed to give ACK frames priority over data transfer cycles, thereby allowing transmissions of data to be scheduled without having to coordinate the channel for ACK frames at the opportunistic block transfer protocol layer. Instead, the lower-layer hardware is allowed to provide priority access to the channel for ACK frames while the DATA frames have access to the channel with a lower priority. Since the current generation of hardware now supports EDCF for the Atheros-based chipsets through the madwifi driver, such hardware provides an approach for handling frame-level contention. Accordingly, EDCF may be employed so that the entire data flow for opportunistic block transfer protocol, such as those described previously, may be implemented with loosely-coupled transmissions.

Figure 5:
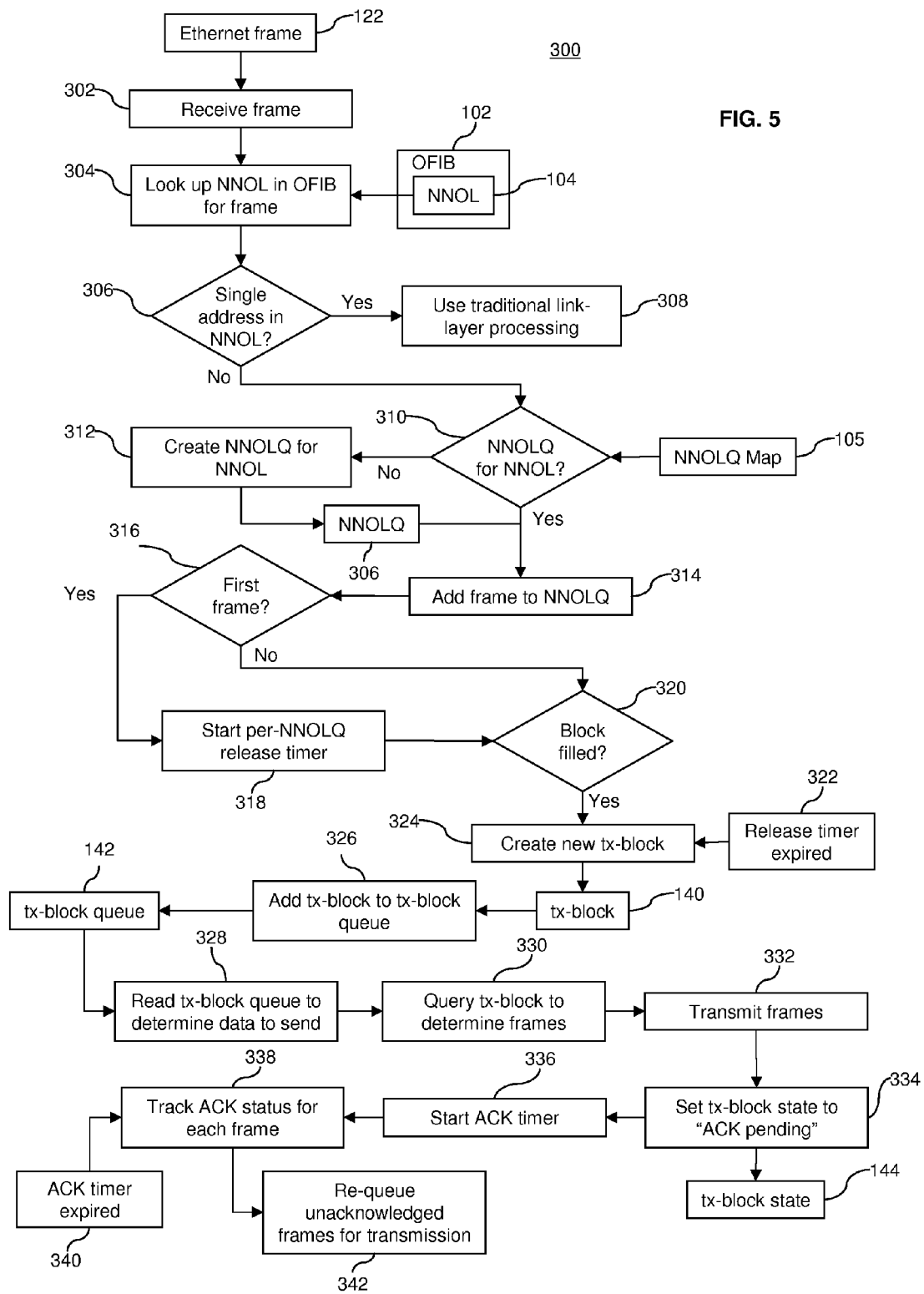
FIG. 5 illustrates an example data flow for transmitting a frame through an opportunistic block transfer protocol engine.

FIG. 5 illustrates a data flow 300 for transmitting a frame through an opportunistic block transfer protocol engine. For example, the data flow 300 may be applied to the transmission of frames 1-10 from transmitter 100A illustrated in FIG. 4. As shown in FIG. 5, in step 302, data, such as Ethernet frame 122, is handed down to the engine. Step 304 looks up the NNOL 104 in the OFIB 102 for the frame 122. In step 306, it is determined whether the NNOL 104 only contains a single address. If the NNOL 104 only contains a single address, the frame 122 is handled according to traditional link-layer processing in step 308. Otherwise, it is further determined in step 310 from a NNOL queue map 105 whether an NNOL queue 106 exists for the NNOL 104. If not, the NNOL queue 106 is created in step 312. In step 314, the frame 122 is added to the NNOL queue 106. Step 316 determines if the NNOL queue 106 is empty and if the frame 122 is the first frame to be added to the NNOL queue 106. If so, in step 318, a block release timer is started, with, for example, a nominal 1 ms accuracy. Assuming a 24 Mbps burst rate, this translates into 24 kbits, or 3 kbytes. A release timer exists for each NNOL queue 106.

In step 320, it is determined whether the addition of frame 122 to the NNOL queue 106 in step 314 causes the queue length to fill a block with a threshold length (e.g., 32 frames). If so, a new tx-block (transmit block) 140 for the filled block is created in step 324 and queued in a tx-block queue 142 in step 326. Whenever the block release timer expires for an NNOL 104 in step 322, a new tx-block 140 is also created in step 324 and queued in the tx-block queue 142 in step 326. All frames 122 from the NNOL queue 106 are extracted for the tx-block 140 at the expiration of the timer in step 322, so the timer does not have to be restarted at this point. The last frame 122 in the block is marked to indicate when the last frame has been transmitted in steps below.

The transmitter reads from the tx-block queue 142 in step 328 to send data. The tx-block 140 indicated by the tx-block queue 142 is queried in step 330 to determine the frames 122 to be transmitted. The frames 122 are then transmitted in step 330. All data is sent at one priority through the EDCF process described previously.

Once it is determined in step 332 that the last frame 122 corresponding to the tx-block 140 has been transmitted, the tx-block state 144 is put into "ACK pending" mode, and an ACK timer for the tx-block 140 is started in step 334. The timer gives receivers a chance to acknowledge the frames before they are re-queued for transmission by the transmitter. For example, after sending the block 110 with frames 1-10, the transmitting node 100A in FIG. 4 may employ a timer to wait for ACK messages to be received from receiving nodes 100B, 100C, and 100D. The ACK status of each frame 122 is tracked for a tx-block state 144. When the ACK timer expires in step 340, any remaining frames 122 that have not been acknowledged are re-queued for transmission. In the example of FIG. 4, all frames 1-10 have been acknowledged for node 100A, so no frames are re-queued for transmission. A new NNOL is determined for the unacknowledged frames. The HC is used to determine the time-to-live (TTL) for each frame 122. As such, the HC of frames is decremented when the frames are re-queued. If the HC is zero for a frame, then the frame will be discarded. The normal rules for generating a new tx-block apply, so a new tx-block may be queued immediately. The rules for generating a new tx-block applies, which may cause a new tx-block to be queued immediately.

Figure 6:
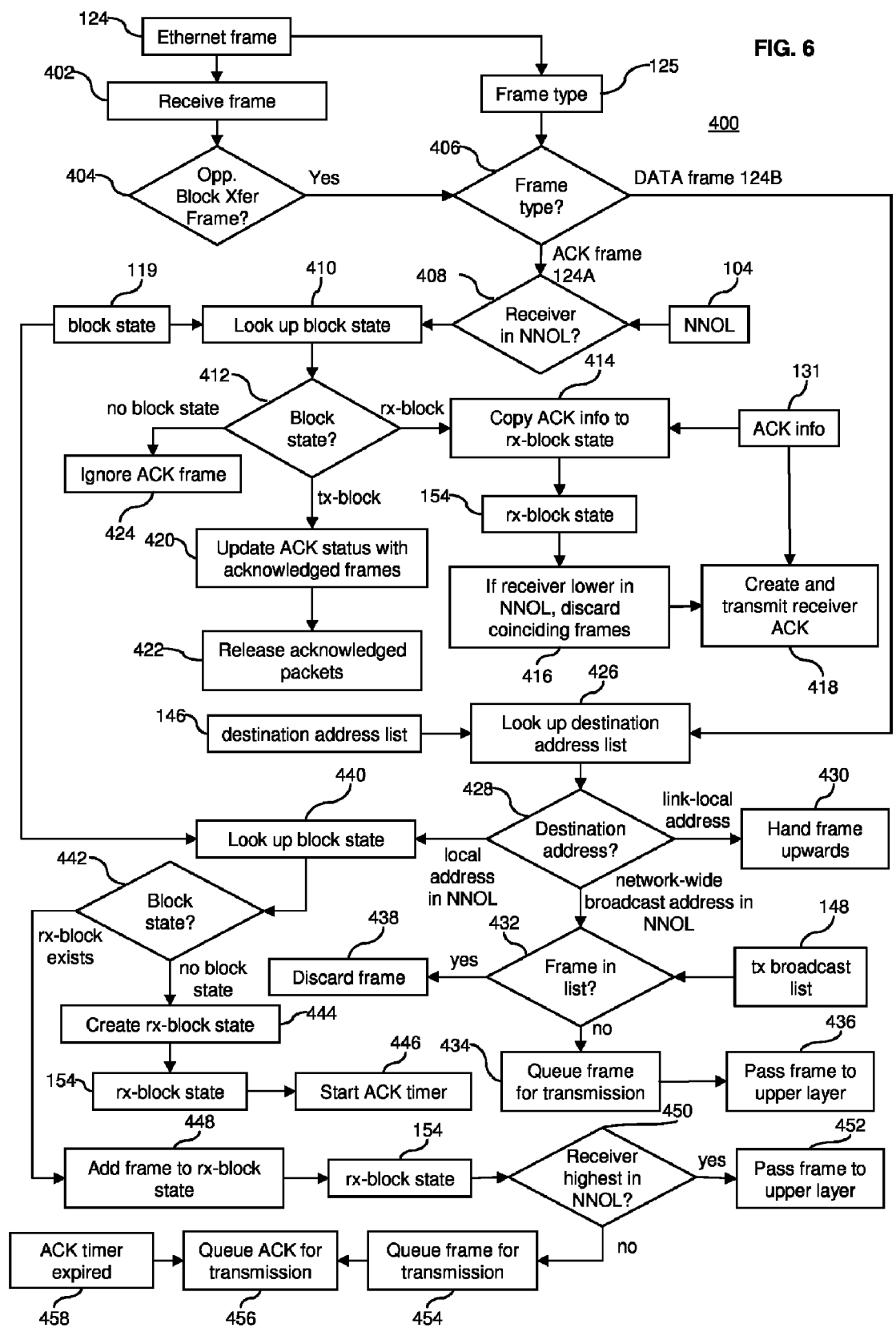
FIG. 6 illustrates an example data flow for receiving a frame through an opportunistic block transfer protocol engine.

FIG. 6 illustrates a data flow 400 for receiving a frame through an opportunistic block transfer protocol engine. In step 402, a frame 124 from a transmitter is received by a receiver. For example, in step 204 of FIG. 4, receiving node 100B receives frames 1-3 and 5-10 from node 100A; node 100C receives frames 1-2, 4-5, 7, and 9-10; and node 100D receives 1, 3, 5, 7, and 9. Step 404 determines whether the frame 124 is a frame corresponding to opportunistic block transfer protocol. If so, the frame type 125 is checked in steps 406 and 408. If the frame 124 is an ACK frame 124A and the receiver is listed in the NNOL 104 of the block corresponding to ACK frame 124A, step 410 looks up the block state 119 according to a block source address and block ID indicated by the received ACK frame 124A. The block source address identifies the transmitter of the ACK frame 124A. If the source address is not one of the addresses in the NNOL 104, an error is logged.

If the step 412 determines that the block state 119 corresponds with an rx-block (receive block) 150 already received by the receiver, the ACK information 131 from the ACK frame 124A is copied in step 414 into an rx-block state 154 corresponding to the source address. Some of the frames being acknowledged in the ACK frame 124A may coincide with frames in the rx-block 142. As the data is copied in step 414, if the priority of the received ACK frame 124A is higher in order in the NNOL 104 than that of the receiver, any such coinciding frames are discarded in step 416 at the receiving node, since the source node of the ACK frame 124A accounts for these frames. The ACK information 131 is used when the ACK frame from the receiving node is ready for transmission. In this way, the ACK frame from the receiving node repeats what was heard in other ACK frames.

For example, as discussed previously, the node 100B in step 206 of FIG. 4 receives ACK frames 130C and 130D which correspond with the block 110 transmitted by node 100A. Frames 1-3 and 5-10 of block 110 were previously received by node 100B in step 204. ACK frame 130C acknowledges that frames 1-2, 4-5, 7, and 9-10 have been received by node 130C, and ACK frame 130D acknowledges that frames 1, 3, 5, 7, and 9 have been received by node 130D. The information from ACK frames 130C and 130D are incorporated into the ACK frame 130B from node 100B. Furthermore, all frames 120 received by node 100B, except frames 6 and 8, have been received by nodes 100C and 100D which have a higher priority in the NNOL 104 than node 100B. Therefore, frames 1-3, 5, 7, and 9-10 in node 100B are discarded. As such, block 112, which is transmitted by node 100B in step 208, only contains frames 6 and 8.

On the other hand, if the block state 119 indicates that the ACK frame 124A corresponds with a tx-block previously transmitted by the receiver itself, the ACK status of the frames acknowledged by the ACK frame 124A is updated in step 420 and the acknowledged packets are released in step 422. For example, as discussed previously, node 100A in FIG. 4 receives ACK frames 130B, 130C, and 130D, which correspond with the block 110 transmitted by node 100A itself. As such, node 100A determines that the frames 1-10 have been received by one or more of the nodes 100B, 100C, and 100D and updates the status of frames 1-10 accordingly.

However, if the ACK frame 124A refers to a block state 119 that does not exist at the receiving node, the missing block state 119 indicates that the receiver has not received any of the frames of the corresponding block. As such, the ACK frame 124A may be ignored in step 424.

If step 406 indicates that the frame 124 is a DATA (or INFO) frame 124B from a transmitting node, the destination address list 146 is checked in step 426. If step 428 determines that the destination address list 146 contains the link-local "broadcast" address, the DATA frame 124B is handed up in step 430 and no other processing occurs for the frame 124B. However, if the frame 124B contains the network-wide broadcast address in the NNOL 104, the frame 124B is checked against the tx (transmission) broadcast list 148 in step 432. If the frame 124B is not in the list 148, the frame 124B is queued for transmission in step 434 and passed up to the upper layer in step 436. If, however, the frame 124B is already in the list 148, the frame is discarded in step 438.

If the DATA frame 124B includes the local address of the receiver in the NNOL 104, step 440 looks up the block state 119. If the block state 119 corresponding to the frame 124B does not exist according to step 442, a new rx-block state 154 is created in step 444, and the frame 124B is assigned to this rx-block state 154. If, for example, frame 1 of FIG. 4 is the first frame received by node 100B, a new rx-block state is created for frames 120 in block 110 which may be subsequently received by node 100B. In step 446, an ACK timer is started to determine when an ACK frame is transmitted from the receiver acknowledging receipt of frame 124B. The ACK frame is sent according to an ACK sequence determined by the NNOL. For example, the first position gets a 1.0 ms timer, the second position gets 1.5 ms timer, etc. If the destination address for the frame 124B is the local address, the frame 124B is passed to the upper layers without substantial delay. This process occurs on a frame-by-frame basis, as a block can have both transit frames and terminating frames.

If the block state 119 in step indicates that the DATA frame 124B corresponds with an rx-block (receiver block) 150, the frame 124B is added to the rx-block state 154 and the block state 124 is updated in step 448. For example, if frame 2 of FIG. 4 is received by node 100B after frame 1, an rx-block state has already been created and frame 2 is added to the rx-block state. If, according to step 450, the receiving node has the highest priority according to NNOL 104, frame 124B is passed to the upper layers in step 452. Otherwise, the frame 124B is queued for transmission in step 454. When the ACK timer expires in step 458, an ACK message is queued for the transmit thread in step 456. For instance, nodes 100B, 100C, and 100D send ACK frames 130B, 130C, and 130D, respectively, when the ACK timer on each respective node expires. Employing the EDCF process described previously, ACK messages may be queued directly within the driver at a second priority queue (ACK queue) which has precedence.

FIG. 8A provides an example of the fields 601 and corresponding values 602 that may be employed in frames according to opportunistic block transfer protocol. FIG. 8B provides additional fields 603 and corresponding values 604 for ACK frames. FIG. 8C provides additional fields 605 and corresponding values 606 for INFO, i.e., data, frames.

Traditional link-layer functions of MAC protocols such as IEEE 802.11b/g include contention management, power control, and waveform transmission. Each of these functions is dependent on feedback from the receiver at the end of a transmission event. For example, 802.11b/g uses information in the ACK frame to learn the signal margin at the receiver so it can adjust the power level of the transmitter. Likewise, 802.11b/g uses information in the ACK frame to adjust which waveform to use when transmitting to that destination. Finally, the default clearing function (DCF) within IEEE 802.11b/g is designed with a variable contention window to allow stations to properly compete for access to the channel with a minimum of collisions. The initial window size for IEEE 802.11g is 16 slots. As the number of competing nodes increases, the probability of a collision increases dramatically. The DCF works to maintain efficient use of the channel. To do this, the protocol balances delays in accessing the channel against collision avoidance. When the network is lightly loaded, the DCF picks a small contention window to minimize the amount of delay in accessing the channel. When the DCF detects that the channel is busy, it expands the contention window to avoid collisions. The DCF cannot directly detect a collision at the transmitter, since it is a half-duplex system. Instead, DCF can only detect a collision when the receiver does not deliver an ACK message in response to a transmitted frame.

While some processes rely on the DATA/ACK cycle of unicast transmission under the IEEE 802.11b/g standard, embodiments employing opportunistic block transfer protocol do not employ a DATA/ACK cycle, where all broadcasts are link-layer broadcasts. Thus, the transmitter cannot expect to get feedback about collisions, link margin, or appropriate waveform from the receiver using a DATA/ACK cycle.

However, the ACK process under opportunistic block transfer protocol provides the feedback necessary to determine link margin and waveform information. This information is provided to the routing engine. Using information about the overall network topology, the routing engine can then assign the appropriate power levels and bitrates to optimize network performance. If there are few nodes within reach, the routing engine can assign a higher power level to be used for specific route entries. If the nodes are easily within reach and have substantial spare margin at the receiver, the routing engine can assign a higher bitrate for transmissions to specific routing entries.

In general, when a transmission is scheduled within opportunistic block transfer protocol, the routing engine determines the waveform bitrate on a node basis, rather than a per-transmission basis, to complete that transmission. As such, the bitrate acts like a management parameter for opportunistic block transfer protocol. The waveform bitrate of transmissions may be either fixed or dynamic. If the bitrate is dynamic, the bitrate can also be used to adjust the number of neighboring nodes. opportunistic block transfer protocol may function more effectively when it has a target number of several neighboring nodes. Thus, opportunistic block transfer protocol may monitor the number of neighboring nodes and adjust the bitrate to reach some level of connectivity to the entire network (avoiding having only a single link to the larger network) while otherwise keeping the number of neighboring nodes near the target number.

Embodiments employing opportunistic block transfer protocol monitor the channel for bursts and use them to track channel occupancy to avoid too many transmitters attempting to simultaneously access the channel. An aspect of these embodiments is to allow one transmitter to transmit its burst as quickly as possible so the ACK frames can be processed and the frames can continue their journey across the network. ACK messages from previous blocks are allowed to interrupt these bursts (based on EDCF priority access to the medium), so they are not considered within this context. The network is monitored for bursts; when a burst is observed, the local transmitter defers its transmission. When two nodes begin their transmission at nearly identical times, they will both complete their burst. When two bursts inter-mingle, the nodes record this as a collision and increase their randomization period for accessing the medium. When a transmitter has a burst to send, it computes a random backoff to use if the channel was recently busy and waits to begin the burst by that amount. This approach is essentially the DCF backoff algorithm re-cast to use intermingling of bursts as a "collision" and the back-off time to be used before a burst, rather than before each frame.

Embodiments employing opportunistic block transfer protocol also support antenna diversity. Since the system broadcasts to many users, transmitter diversity is not suitable. Therefore, a single transmit antenna is used for all transmissions. Accordingly, receiver diversity may be employed to increase the likelihood that any specific frame can be received.

IEEE 802.11b/g systems have been observed to exhibit significant physical-layer capture effects when two transmitters attempt to use the channel nearly simultaneously. When this occurs, the transmitter that successfully transmits the frame does not detect the channel contention and does not expand its contention window. The other node, which was unsuccessful in transferring its frame and did not receive an ACK frame, does expand its contention window. This effect results in short-term unfair channel access. However, for opportunistic block transfer protocol, this effect indicates that nodes within the network can successfully transfer data between peers during some collisions.

Embodiments employing opportunistic block transfer protocol transmit in bursts. The timing of the protocol is linked to the trailing frame of a burst. However, in the implementation of opportunistic block transfer protocol on COTS hardware, the driver for the COTS hardware and the hardware itself has its own queuing. This masks the time that a frame is released over the air. To compensate for this, a back-channel from the driver is implemented to indicate when frames were released.

The design of the mad-wifi driver uses a transmit descriptor (TD) design. TDs are communicated to the hardware to schedule transmissions. Once a TD is processed, the hardware can schedule an interrupt back to the processor so the TD can be reaped and re-used. When a TD is reaped, it can call a finalize function. Notification of the completion of a frame may be included in this function. Conceptually, the function would simply announce some unique identifier of the frame back to registered modules.

However, each TD has a flag indicating if it should cause an interrupt when processed, and, in order to minimize the number of interrupts, the driver limits the number of TDs marked with the interrupt flag. Since the time of the actual flight of the frame is recorded, and perhaps even reacting at that time, a mechanism is employed to force the last frame in a block to be marked to cause an interrupt.

Figure 7:
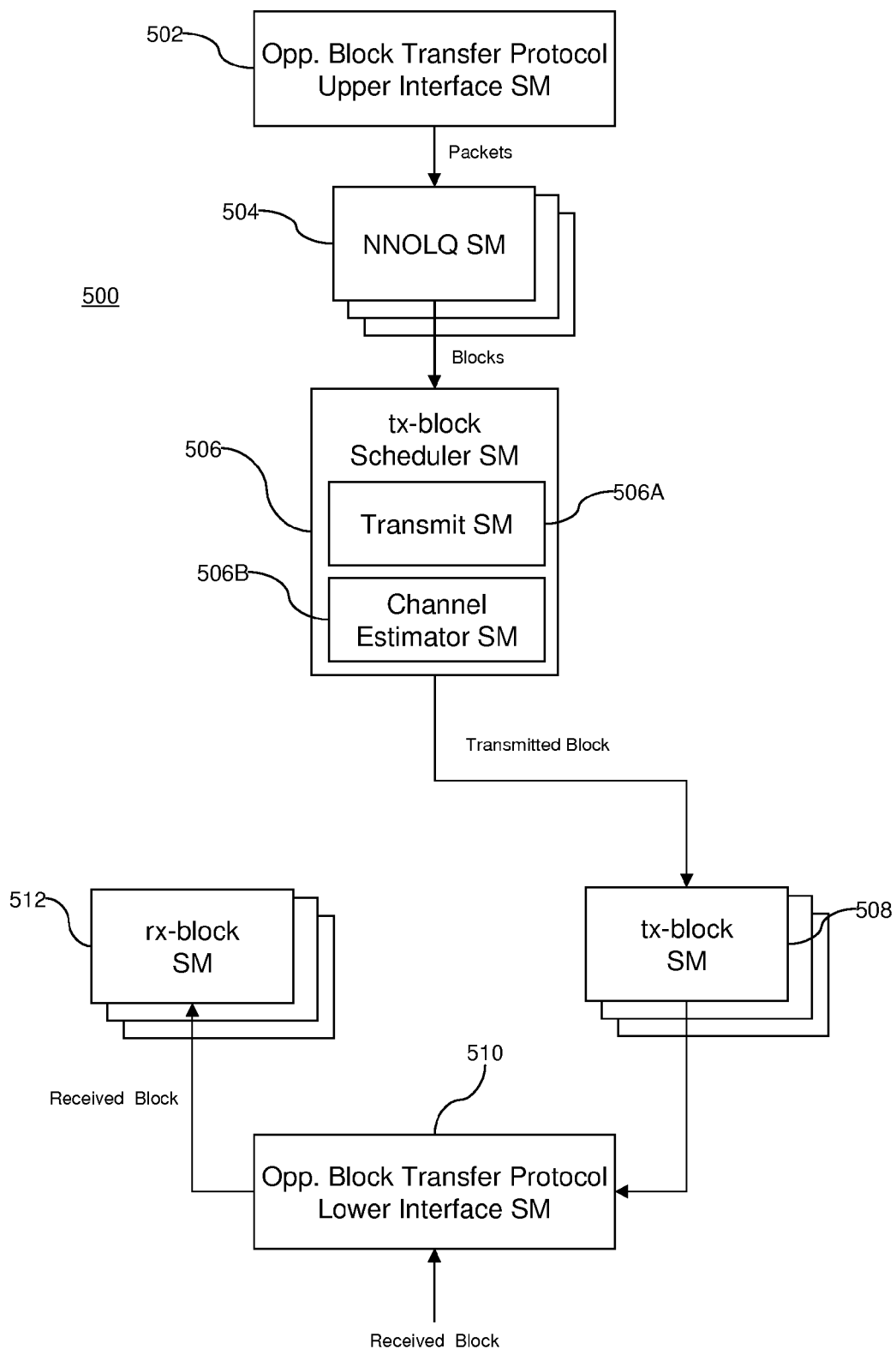
FIG. 7 illustrates an example state machine (SM) design according to opportunistic block transfer protocol.

FIG. 7 provides further details on a state machine (SM) design 500 in accordance with opportunistic block transfer protocol. For example, the SM design 500 may be employed with the data flows 300 and 400 illustrated in FIGS. 5 and 6, respectively. In particular, FIG. 7 shows a single upper interface state machine (UISM) 502 that interfaces with the operating system over which opportunistic block transfer protocol is operating. The UISM 502 then passes packets, based on their next-hop list, to the appropriate NNOL queue (NNOLQ) SM 504. There may be a plurality of NNOLQ SMs, all indexed by their NNOL. Once a block is ready for transmission, the block is sent to a transmit block (tx-block) scheduler SM 506. Once a block is released for transmission, the information of the block is kept in a transmit block state machine (tx-block SM) 508, one per block. Each tx-block SMs 508 is indexed by its block ID along with the local transmitter's MAC address. A single lower interface state machine (LISM) 510 exists to interface with the operating system. When the LISM 510 receives frames, the states of the frames are tracked in receive block state machines (rx-block state SMs) 512. The rx-block SMs are indexed by the transmitter's address and block ID.

FIG. 9A illustrates examples of state transitions 611 for the UISM 502. FIG. 9B illustrates examples of state definitions 612 for the UISM 502. FIG. 9C illustrates examples of event definitions 613 for the UISM 502. FIG. 9D illustrates examples of condition definitions 614 for the UISM 502. FIG. 9E illustrates examples of transition action definitions 615 for the UISM 502.

The upper interface state machine (UISM) 502 acts as an interface, e.g., Ethernet interface, to external devices. It also provides an external management interface specific for configuring the OFIB tables 102 and communicating changes in packet delivery rates to the routing engines. The UISM 502 handles the normal flow of packets as two events, the original arrival of a pre-route-lookup frame (PRUF) and then the subsequent arrival of a frame (PLUF) which results from the OFIB lookup of the destination address.

FIG. 10A illustrates examples of state transitions 621 for the NNOLQ SM 504. FIG. 10B illustrates examples of state definitions 622 for the NNOLQ SM 504. FIG. 10C illustrates examples of event definitions 623 for the NNOLQ SM 504. FIG. 10D illustrates examples of condition definitions 624 for the NNOLQ SM 504. FIG. 10E illustrates transition action definitions 625 for the NNOLQ SM 504.

The NNOLQ SM 504 groups frames to the same NNOL 104 into blocks for transmission. For example, as described earlier, the frames 1-10 in FIG. 2 correspond to the same NNOL 104 and are grouped into block 110. The basic operation of the NNOLQ SM 504 uses a release timer that controls the pace at which blocks are handed down to the block scheduler SM 506 for transmission. Once a frame arrives, this timer is started. If the machine either gets a full block (e.g., 32 frames) or the timer expires, a block is presented to the transmit block scheduler SM 506. Steps 320, 322, and 324 of FIG. 5 provide an example of this process. The transmit block scheduler SM 506 determines the pace at which blocks are handed to the physical layer. As the engine only queue frames until a block is ready, the queue in the engine can be sized to hold a full set of frames, so there is no need for a capacity error condition with the queue.

The NNOLQ SM 504 may also run a second timer when it is idle. When the IDLE timer expires, the NNOLQ SM 504 notifies the UISM 502 that the NNOLQ has been idle. In this case, the NNOLQ may be reaped when a specific NNOL 104 is no longer needed.

FIG. 11A illustrates examples of state transitions 631 for the tx-block scheduler SM 506. FIG. 11B illustrates examples of state definitions 632 for the tx-block scheduler SM 506. FIG. 11C illustrates examples of event definitions 633 for the tx-block scheduler SM 506. FIG. 11D illustrates examples of condition definitions 634 for the tx-block scheduler SM 506. FIG. 11E illustrates transition action definitions 635 for the tx-block scheduler SM 506.

The tx-block scheduler SM 506 queues blocks for transmission and monitors the lower layer to determine when the final frame of a block has been actually transmitted. The opportunistic block transfer protocol may run above the driver level, so it is loosely coupled with the hardware and does not know when a frame actually released into the air. Thus, to properly set the timer for receiving ACK messages from the receivers, the tx-block scheduler SM 506 provides information on the actual release time.

Also, opportunistic block transfer protocol may have to minimize the number of blocks that are concurrently being transmitted by different nodes. If too many nodes are transmitting simultaneously, the expected time for a block to be transmitted will be greatly increased. In this case, the ACK timers may expire at the receiving nodes indicating erroneously that a block (with missing frames) has been fully transmitted when in fact the frames are still at the transmitter. Also, the underlying 802.11 DCF engine nominally adjusts its DCF window to accommodate varying numbers of transmitters. The DCF contention window is increased when collisions occur to allow the transmitters to be spread across a larger interval to minimize future collisions and then the window shrinks when the number of transmitters is reduced. However, as discussed previously opportunistic block transfer protocol uses the 802.11 DCF in broadcast mode, which does not use any ACK messages. Thus, the DCF will never sense any collisions and the DCF window will always stay at its minimum size. Opportunistic block transfer protocol takes on the responsibility of spreading the traffic load to compensate for this effect. To do so, the block transmit scheduler SM 506 monitors received frame activity and adjusts its queuing of transmissions with the lower layer.

The tx-block scheduler SM 506 employs aspects of the DCF, but at a higher level of abstraction. The algorithm minimizes the number of interleaved blocks. Ideally, each block would be transmitted with full access to the channel. However, the reality is that the system does not have sufficiently tight control over transmit epochs to have such access. Instead, the algorithm tracks the number of transmitters and, based on the information in the header of the frames, computes a network allocation vector (NAV). The NAV is used to anticipate the end of the current block(s), and the corresponding time is tracked by the NAV timer. A channel access (CA) timer introduces a variable amount of delay based on the history of previous interleaving blocks, because interleaving blocks are roughly equivalent to a collision for the DCF algorithm. A dynamic parameter called the CAB bounds the upper limit of the CA timer.

The tx-block scheduler SM 506 determines how to act when blocks are ready according to whether the channel is occupied or not. As such, the tx-block scheduler SM 506 may be divided into two simpler machines, one state machine dealing with the transmit function and another state machine dealing with the channel. Thus, FIG. 7 illustrates a transmit SM 506A and a channel estimator SM 506B within the tx-block scheduler SM 506. The channel estimator SM 506B tracks incoming frames and identifies transitions between channel idle and channel busy and passes these indications to the transmit state machine.

FIG. 12A illustrates examples of state transitions 641 for the channel estimator SM 506B. FIG. 12B illustrates examples of state definitions 642 for the channel estimator SM 506B. FIG. 12C illustrates examples of event definitions 643 for the channel estimator SM 506B. FIG. 12D illustrates examples of condition definitions 644 for the channel estimator SM 506B. FIG. 12E illustrates transition action definitions 645 for the channel estimator SM 506B.

As discussed previously, the LISM 510 interacts with the network interface of the driver upon which the virtual network device has been configured according to the opportunistic block transfer protocol. FIG. 13A illustrates examples of state transitions 651 for the LISM 510. FIG. 13B illustrates examples of state definitions 652 for the LISM 510. FIG. 13C illustrates examples of event definitions 653 for the LISM 510. FIG. 13D illustrates examples of condition definitions 654 for the LISM 510. FIG. 13E illustrates transition action definitions 655 for the LISM 510.

The tx-block SM 508 is used to track the frames that were transmitted as a block and to determine which frames were acknowledged by receiving nodes and which frames need to be re-transmitted in a new block. Instances of tx-block states 140 are created by the transmit scheduler and then handed to the LISM 510 for tracking and ownership. External events for the tx-block SM 508 come primarily from the LISM 510.

FIG. 14A illustrates examples of state transitions 661 for the tx-block SM 508. FIG. 14B illustrates examples of state definitions 662 for the tx-block SM 508. FIG. 14C illustrates examples of event definitions 663 for the tx-block SM 508. FIG. 14D illustrates transition action definitions 665 for the tx-block SM 508.

The rx-block SM 512 is used to track the status of frames received from a peer entity according to the opportunistic block transfer protocol. Frames are queued within the rx-block SM 512 until it is determined which NNOL entity should retain responsibility for forwarding the frames within a block to the destination.

FIG. 15A illustrates examples of state transitions 671 for the rx-block SM 512. FIG. 15B illustrates examples of state definitions 672 for the rx-block SM 512. FIG. 15C illustrates examples of event definitions 673 for the rx-block SM 512. FIG. 15D illustrates examples of condition definitions 674 for the rx-block SM 512. FIG. 15E illustrates transition action definitions 675 for the rx-block SM 512.

When the block has only one NNOL entity or this state machine is the destination of the frames, the frames are immediately processed. Otherwise, the frames are collected until ACK messages are heard from all the NNOL entities or the ACK timer expires and the machine assumes some of the NNOL entities did not participate in processing this block. At such time, the frames which are still unacknowledged by higher precedence NNOL entities are then handed to the upper interface state machine to continue their journey across the network.

Accordingly, embodiments of the present invention employing opportunistic block transfer protocol provide a wireless network protocol that addresses the problems that may result from frequent changes in communications channels. In particular, the embodiments employ a hop-by-hop block formation approach in which data packets are organized into data blocks at each hop according to a routing table and are transmitted to each hop as data blocks. By using the same approach at each hop, opportunistic block transfer protocol is simpler to implement and performs more efficiently over larger networks than other protocols, such as the ExOR protocol which employs a modal approach.

The foregoing specific embodiments of the present invention as set forth in the specification herein are for illustrative purposes only. Various deviations and modifications can be made within the spirit and scope of this invention, without departing from the main theme thereof. It will be appreciated by persons skilled in the art that the present invention is not limited by what has been particularly shown and described herein above. While the present invention has been described in connection with a number of exemplary embodiments, and implementations, the present inventions are not so limited, but rather cover various modifications, and equivalent arrangements, which fall within the purview of prospective claims.

What is claimed is:

1. A method for transferring data over an electronic network, the method comprising:
   determining, at a source node, a first routing table defining a network route between the source node and a destination node, the first routing table including one or more intermediate nodes;
   ranking, in the first routing table, the one or more intermediate nodes and the destination node, the destination node having a highest ranking in the first routing table;
   grouping, at the source node, a plurality of data packets into a first data block associated with the first routing table;
   transmitting, from the source node, the plurality of data packets according to the first routing table;
   transmitting, from each of the one or more intermediate nodes and the destination node, an acknowledgment indicating which of the plurality of data packets were received from the source node, the acknowledgment further indicating which of the data packets were received by higher-ranking nodes in the first routing table;
   determining, at each intermediate node, a new routing table defining a new network route between the intermediate node and the destination node;
   determining, for each intermediate node, any unacknowledged data packets that were received by the intermediate node but not acknowledged by nodes in the first routing table having a higher rank than the intermediate node, the unacknowledged data packets defining a subset of data packets;
   grouping, at each intermediate node, the subset of the data packets into a new data block associated with the new routing table; and
   transmitting, from each intermediate node, the subset of data packets according to the new routing table.

2. The method according to claim 1, further comprising:
   determining, at the source node, any unacknowledged data packets that were not received by the one or more intermediate nodes and the destination node;
   determining, at the source node, a second routing table defining a second network route between the source node and a destination node; and
   transmitting, from the source node, the unacknowledged data packets according to the second routing table.

3. The method according to claim 1, wherein the acknowledgment is transmitted in a sequence based on rankings in the first routing table.

4. The method according to claim 1, wherein determining the first routing table comprises determining packet delivery rates to optimize the network route, and determining the new routing table comprises determining packet delivery rates to optimize the new network route.

5. The method according to claim 1, wherein grouping, at the source node, the plurality of data packets comprises grouping the data packets in a queue associated with the first routing table, and transmitting the plurality of data packets comprises transmitting the data packets when the queue reaches a threshold length or a timer for a blocking interval expires.

6. The method according to claim 1, wherein grouping, at each intermediate node, the subset of the data packets comprises grouping the subset of data packets in a queue associated with the new routing table, and transmitting the subset of data packets comprises transmitting the subset of data packets when the queue reaches a threshold length or a timer for a blocking interval expires.

7. The method according to claim 1, wherein each of the one or more intermediate nodes and the destination node receive, in a queue associated with the first routing table, any of data packets from the source node.

8. The method according to claim 1, wherein the plurality of data packets transmitted from the source node and the subset of data packets transmitted from each intermediate node are transmitted via link-layer broadcast.

9. The method according to claim 1, further comprising:
determining network topology information based on any transmitted acknowledgements; and
applying the network topology information to optimize network performance.

10. The method according to claim 1, further comprising coordinating the transmission of the acknowledgments with transmission of other data over a channel by applying enhanced distributed coordination function (EDCF).

11. A method for transferring data over an electronic network, the method comprising:
receiving a plurality of data packets at a source node for transmission over an electronic network to a destination node;
identifying one or more intermediate nodes defining a network route between the source node and the destination node;
ranking the one or more intermediate nodes and the destination node in a routing table, the destination node having a highest rank;
grouping the data packets into a data block associated with the routing table;
transmitting the data packets from the source node to be received by the nodes in the routing table;
transmitting, for each node receiving any of the data packets, an acknowledgment indicating which data packets were received by the receiving node, the acknowledgment further indicating which data packets were received by nodes having a higher ranking in the routing table;
for the source node, determining any unacknowledged data packets that were not acknowledged by any nodes in the routing table and transmitting the unacknowledged data packets as a new block; and
for each node receiving any of the data packets, determining any unacknowledged data packets that were received by the node but not acknowledged by nodes having a higher rank in the routing table, and transmitting the unacknowledged data packets as a new block.

12. The method according to claim 11, wherein the step of transmitting an acknowledgment from the receiving node comprises transmitting the acknowledgment in a sequence based on rankings in the routing table.

13. The method according to claim 11, further comprising determining the packet delivery rates between nodes in the routing table, wherein the one or more intermediate nodes are identified and ranked according to the delivery rates.

14. The method according to claim 11, wherein the step of grouping the data packets into a data block comprises grouping the data packets in a queue associated with the routing table, and the step of transmitting the data packets comprises transmitting the data packets when the queue reaches a threshold length or a timer for a blocking interval expires.

15. The method according to claim 11, wherein each receiving node groups the data packets transmitted from the source node in a queue associated with the routing table.

16. The method according to claim 11, further comprising grouping, for each node receiving any of the data packets, the unacknowledged data packets into the new data block according to a new routing table defining a new network route between the node and the destination node.

17. The method according to claim 11, wherein the data packets and the acknowledgment from each receiving node are transmitted via link-layer broadcast.

18. The method according to claim 11, further comprising determining network topology information based on the acknowledgement transmitted by each receiving node, and applying the network topology information to optimize network performance.

19. The method according to claim 11, wherein the steps of transmitting the data packets and transmitting the acknowledgment comprise applying enhanced distributed coordination function (EDCF) to coordinate the transmission of the acknowledgment over a channel.

20. A method for transferring data on an electronic network comprising:
receiving a plurality of data packets grouped as a first data block from a source node, the source node transmitting the data according to a first routing table associated with the first data block, the first routing table including ranked nodes and defining a first network route to a destination node;
transmitting an acknowledgment indicating which of the plurality of data packets have been received;
determining which of the plurality of data packets have not been acknowledged by any nodes having a higher rank in the first routing table;
determining a second routing table defining a second network route to the destination node;
grouping the unacknowledged data packets in a second data block associated with the second routing table; and
transmitting the unacknowledged data according to the second routing table.

21. The method according to claim 20, wherein the acknowledgment further indicates which data packets were received by nodes having a higher ranking in the first routing table.

22. The method according to claim 20, wherein transmitting the acknowledgment comprises transmitting the acknowledgment in a sequence based on rankings in the first routing table.

23. The method according to claim 20, further comprising grouping the received data packets in a queue associated with the first routing table.

24. The method according to claim 20, wherein the transmissions employ linklayer broadcast.

25. The method according to claim 20, wherein the transmissions employ enhanced distributed coordination function (EDCF) to coordinate the transmission of the data and the acknowledgment over a channel.

26. An electronic network comprising:
a source node configured to group data packets into a first data block and transmit the data packets over an electronic network;
a destination node configured to receive the data packets transmitted from the source node; and
a first set of intermediate nodes defining a first route between the source node and the destination node, the first set of intermediate nodes being included in a first routing table associated with the first data block, each intermediate node in the first set being configured to determine a subset of the data packets to be transmitted to the destination node to complete transmission of the first data block to the destination node, and each intermediate node in the first set being configured to group the subset of data packets into a new data block associated with a new routing table and transmit the subset of data packets according to the new routing table, the new routing table including a new set of intermediate nodes defining a new route between the intermediate node and the destination node;
wherein the first routing table ranks each of the first set of intermediate nodes and the destination node, the destination node having a highest rank in the first routing table, and each intermediate node in the first set is configured to determine any unacknowledged data packets that were received by the intermediate node but not acknowledged by nodes in the first routing table having a higher rank, the unacknowledged data packets defining the subset of data packets transmitted by the intermediate node; and
wherein each intermediate node in the first set is further configured to transmit an acknowledgment indicating which of the data packets were received from the source node, the acknowledgment further indicating which of the data packets were received by nodes in the first routing table having a higher rank than the intermediate node.

27. The electronic network according to claim 26, wherein the source node is further configured to determine any unacknowledged data packets that were not received by the first set of intermediate nodes and the destination node and to transmit the unacknowledged data packets according to a second routing table, the second routing table defining another network route between the source node and the destination node.

28. The electronic network according to claim 26, wherein network topology information is determined based on the transmission of acknowledgements, and the network topology information is applied to optimize network performance.

29. The electronic network according to claim 26, wherein transmission of the acknowledgment is coordinated with transmission of other data over a channel by applying enhanced distributed coordination function (EDCF).

30. The electronic network according to claim 26, wherein the acknowledgment from the at least one first-routing-table node is transmitted in a sequence based on rankings in the first routing table.

31. The electronic network according to claim 28, wherein the new routing table ranks each of the new set of intermediate nodes and the destination node, the destination node having a highest rank in the new routing table.

32. The electronic network according to claim 26, wherein the first route and the new route are optimized according to packet delivery rates.

33. The electronic network according to claim 26, wherein the source node is configured to group the data packets in a queue associated with the first routing table and transmit the data packets when the queue reaches a threshold length or a timer for a blocking interval expires.

34. The electronic network according to claim 26, wherein each intermediate node in the first set is configured to group the subset of data packets in a queue associated with the new routing table and transmits the subset of data packets when the queue reaches a threshold length or a timer for a blocking interval expires.

35. The electronic network according to claim 26, wherein each intermediate node and the destination node receive, in a queue associated with the first routing table, any of data packets from the source node.

36. The electronic network according to claim 26, wherein the packets of data and the acknowledgments are transmitted via link-layer broadcast.

* * * * *